US011988841B2

(12) United States Patent
Moll et al.

(10) Patent No.: US 11,988,841 B2
(45) Date of Patent: May 21, 2024

(54) VOICE INPUT FOR AR WEARABLE DEVICES

(71) Applicant: Snap Inc., Santa Monica, CA (US)

(72) Inventors: Sharon Moll, Lachen (CH); Piotr Gurgul, Hergiswil (CH); Tomasz Zakrzewski, Lachen (CH)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/816,914

(22) Filed: Aug. 2, 2022

(65) Prior Publication Data
US 2024/0045217 A1 Feb. 8, 2024

(51) Int. Cl.
*G02B 27/01* (2006.01)
*G06F 3/01* (2006.01)
*G06F 3/16* (2006.01)
*G06T 19/00* (2011.01)

(52) U.S. Cl.
CPC ......... *G02B 27/0176* (2013.01); *G06F 3/016* (2013.01); *G06F 3/167* (2013.01); *G06T 19/006* (2013.01); *G02B 2027/0138* (2013.01)

(58) Field of Classification Search
CPC ........ G02B 27/0176; G02B 2027/0138; G06F 3/016; G06F 3/167; G06T 19/006
See application file for complete search history.

(56) References Cited

U.S. PATENT DOCUMENTS

| 2015/0279389 | A1 | 10/2015 | Lebeau et al. |
| 2018/0286402 | A1 | 10/2018 | Lebeau et al. |
| 2019/0138085 | A1* | 5/2019 | Eronen ................. G06F 3/0482 |
| 2019/0221214 | A1 | 7/2019 | Bostick et al. |
| 2019/0339840 | A1 | 11/2019 | Park et al. |
| 2021/0043223 | A1* | 2/2021 | Lee ....................... G06F 3/0346 |
| 2021/0118442 | A1* | 4/2021 | Poddar ................... G10L 15/08 |
| 2021/0382605 | A1* | 12/2021 | Edwards ................ G06F 3/167 |

(Continued)

FOREIGN PATENT DOCUMENTS

CN 111524518 A 8/2020

OTHER PUBLICATIONS

"International Application Serial No. PCT/US2023/029111, International Search Report dated Nov. 13, 2023", 3 pgs.

(Continued)

*Primary Examiner* — Stephen T. Reed
(74) *Attorney, Agent, or Firm* — Schwegman Lundberg & Woessner, P.A.

(57) ABSTRACT

Systems, methods, and computer readable media for voice input for augmented reality (AR) wearable devices are disclosed. Embodiments are disclosed that enable a user to interact with the AR wearable device without using physical user interface devices. A keyword is used to indicate that the user is about to speak an action or command. The AR wearable device divides the processing of the audio data into a keyword module that is trained to recognize the keyword and a module to process the audio data after the keyword. In some embodiments, the AR wearable device transmits the audio data after the keyword to a host device to process. The AR wearable device maintains an application registry that associates actions with applications. Applications can be downloaded, and the application registry updated where the applications indicate actions to associate with the application.

18 Claims, 16 Drawing Sheets

(56) References Cited

U.S. PATENT DOCUMENTS

| | | | |
|---|---|---|---|
| 2022/0020482 A1* | 1/2022 | Sreenivasan | G16H 30/40 |
| 2022/0358727 A1* | 11/2022 | Gupta | G06T 19/006 |
| 2022/0374130 A1* | 11/2022 | Pu | G06F 1/3209 |
| 2023/0128422 A1* | 4/2023 | Li | G10L 15/24 |
| | | | 345/156 |

OTHER PUBLICATIONS

"International Application Serial No. PCT/US2023/029111, Written Opinion dated Nov. 13, 2023", 6 pgs.

\* cited by examiner

VOICE INPUT FOR AR WEARABLE DEVICES

TECHNICAL FIELD

Examples of the present disclosure relate generally to input modalities for augmented reality (AR) wearable devices. More particularly, but not by way of limitation, examples of the present disclosure relate to input modalities for invoking AR applications based on voice input to identify applications for the AR wearable device to invoke.

BACKGROUND

Users increasingly want virtual reality (VR), mixed reality (MR), and augmented reality (AR) wearable devices to operate in a more user-friendly manner. However, often, the wearable devices have very little room for interface controls on the wearable devices.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
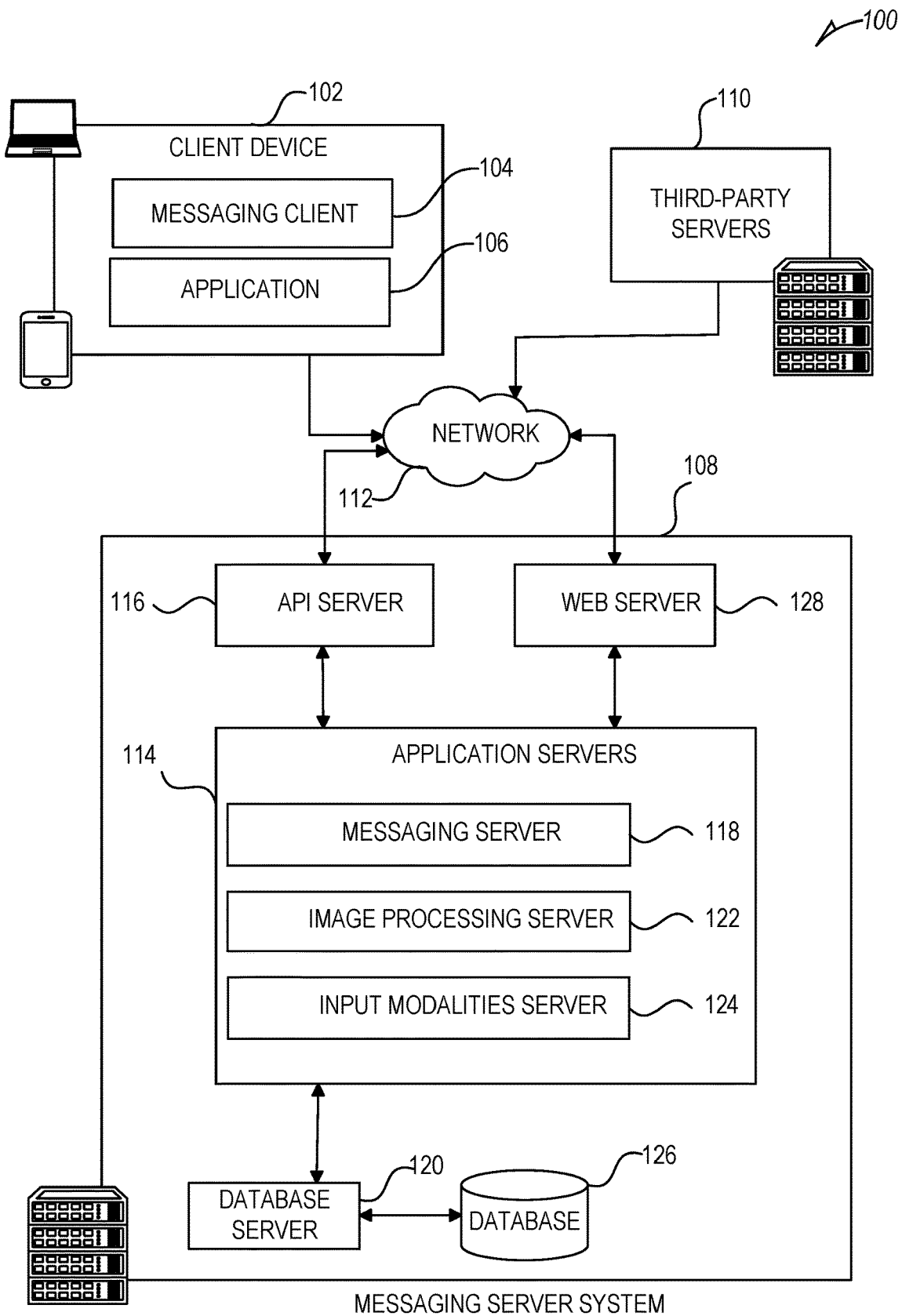
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples of the inventive subject matter. It will be evident, however, to those skilled in the art, that examples of the inventive subject matter may be practiced without these specific details. In general, well-known instruction instances, protocols, structures, and techniques are not necessarily shown in detail.

The term AR wearable device is used as an illustrative device; however, one skilled in the art will recognize that the methods, systems, and computer readable medium disclosed herein are applicable to other wearable devices including VR wearable device and MR wearable devices. Application is used to refer to both AR applications and non-AR applications.

Often AR wearable devices 602 such as AR glasses 900 have limited physical user interface items such as buttons 1278. Some AR wearable devices 602 have one or two buttons 1278 or touchpad 1276 that the user 646 interacts with on a frame 1232 of the AR wearable device 602. However, the number of applications 642 the user 646 may want to access on the AR wearable device 602 is numerous. Additionally, new applications 642 may be downloaded onto the AR wearable device 602.

One challenge is how to make the applications 642 available to the user without the user 646 having to use physical user interface items. The challenge is addressed by recognizing voice commands from the user 646. Additionally, the user 646 may use voice commands to respond to the system 600 to resolve ambiguities regarding which application 642 the user 646 intended to run or to provide inputs to the application 642. The AR wearable device 602 communicates with the user 646 via visual means by displaying information on a display 606 or verbally by using a speaker. The user 646 may use their voice 648, position 650, or gestures 659 to respond to the AR wearable device 602 without resorting to using physical user interface items. In this way, the user 646 may interact with the AR wearable device 602 without using physical user interface items.

Another challenge is how to permit new applications 642 to be downloaded to the AR wearable device 602. The challenge is addressed by the application 642 indicating commands or actions 643 that the application 642 would like to be associated with. The AR wearable device 602 maintains an application registry 645 that associates applications 642 with actions 643. The system 600 uses the application registry 645 to select applications 642 to satisfy the user intent 636.

Another challenge is how to monitor the speech of a user 646. The AR wearable device 602 relies on battery power and processing all the audio data 613 that is received from the user 646 would require power at rate that would require frequent recharging. The challenge is addressed in two ways. First, a keyword is used to indicate to the AR wearable device 602 that a command is about to be uttered by the user 646. A keyword module 652 is resident on the AR wearable device 602 and is trained to recognize the keyword and, in some embodiments, only the keyword. This reduces the power needed to process the audio data 613. The second way this challenge is addressed is that when the keyword is recognized, then the AR wearable device 602 uses either an ML module 614 to process the audio data 613 after the keyword or transmits the audio data 613 to an external host to process the audio data 613. Sending the audio data 613 to an external host reduces the power necessary to process the audio data 613.

The host returns a transcription 656 that is used to determine the proper application 642 to run to satisfy the user intent 636. A third way this challenge is addressed is for the AR wearable device 602 to only monitor the speech based on a haptic user interface item such as a button to be depressed. The AR wearable device 602 then is not wasting energy monitoring the speech unless the user expressly selects for the AR wearable device 602 to monitor the speech.

NETWORKED COMPUTING ENVIRONMENT

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other applications 106. Each messaging client 104 is communicatively coupled to other instances of the messaging client 104 (e.g., hosted on respective other client devices 102), a messaging server system 108 and third-party servers 110 via a network 112 (e.g., the Internet). A messaging client 104 can also communicate with locally-hosted applications 106 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and an input modalities server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

The input modalities server 124 supports input modalities for AR wearable devices. The input modalities server 124 receives requests from an AR wearable device and responds to the requests. The requests include sensor data such as an image being sent to the input modalities server 124 for processing. The input modalities server 124 processes the sensor data and identifies objects within the sensor data and returns names of the objects and positions of the objects within the sensor data to the AR wearable device. Another request from the AR wearable device is for AR applications associated with tags such as "QR code" that may be run on the AR wearable device. The input modalities server 124 may load the AR wearable device with AR applications that are likely to be used by a user of the AR wearable device or respond with AR applications based on criteria given to the input modalities server 124 from the AR wearable device. The criteria may be as a limit on the number of AR applications, preferences of the user such as AR applications with links back to the messaging system 100, and so forth.

Returning to the messaging client 104, features and functions of an external resource (e.g., an application 106 or applet) are made available to a user via an interface of the messaging client 104. In this context, "external" refers to the fact that the application 106 or applet is external to the messaging client 104. The external resource is often provided by a third party but may also be provided by the creator or provider of the messaging client 104. The messaging client 104 receives a user selection of an option to launch or access features of such an external resource. The external resource may be the application 106 installed on the client device 102 (e.g., a "native app"), or a small-scale version of the application (e.g., an "applet") that is hosted on the client device 102 or remote of the client device 102 (e.g., on third-party servers 110). The small-scale version of the application includes a subset of features and functions of the application (e.g., the full-scale, native version of the application) and is implemented using a markup-language document. In one example, the small-scale version of the application (e.g., an "applet") is a web-based, markup-language version of the application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the messaging client 104 determines whether the selected external resource is a web-based external resource or a locally-installed application 106. In some cases, applications 106 that are locally installed on the client device 102 can be launched independently of and separately from the messaging client 104, such as by selecting an icon, corresponding to the application 106, on a home screen of the client device 102. Small-scale versions of such applications can be launched or accessed via the messaging client 104 and, in some examples, no or limited portions of the small-scale application can be accessed outside of the messaging client 104. The small-scale application can be launched by the messaging client 104 receiving, from a third-party server 110 for example, a markup-language document associated with the small-scale application and processing such a document.

In response to determining that the external resource is a locally-installed application 106, the messaging client 104 instructs the client device 102 to launch the external resource by executing locally-stored code corresponding to the external resource. In response to determining that the external resource is a web-based resource, the messaging client 104 communicates with the third-party servers 110 (for example) to obtain a markup-language document corresponding to the selected external resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

SYSTEM ARCHITECTURE

Figure 2:
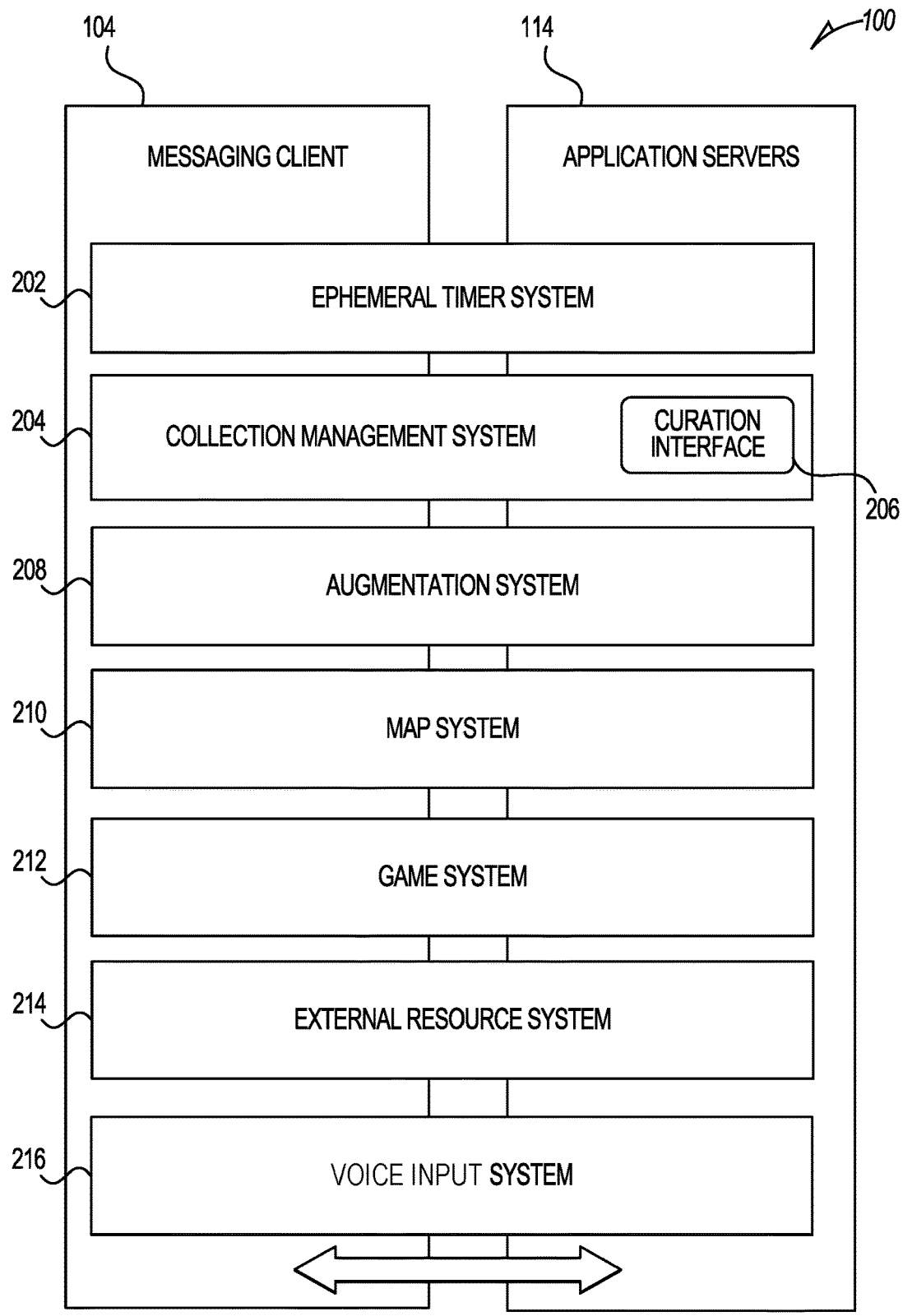
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client-side by the messaging client 104 and on the server-side by the application servers 114. These subsystems include, for example, an ephemeral timer system 202, a collection management system 204, an augmentation system 208, a map system 210, a game system 212, an external resource system 214, and a voice input system 216.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo, a digital object) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time.

The map system 210 provides various geographic location functions and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games that can be launched by a user within the context of the messaging client 104 and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 214 provides an interface for the messaging client 104 to communicate with remote servers (e.g., third-party servers 110) to launch or access external resources, e.g., applications or applets. Each third-party server 110 hosts, for example, a markup language (e.g., HTML5) based application or small-scale version of an application (e.g., game, utility, payment, or ride-sharing application). The messaging client 104 may launch a web-based resource (e.g., application) by accessing the HTML5 file from the third-party servers 110 associated with the web-based resource. In certain examples, applications hosted by third-party servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given external resource access to certain user data of the messaging client 104. HTML5 is used as an example technology for programming games, but applications and resources programmed based on other technologies can be used.

In order to integrate the functions of the SDK into the web-based resource, the SDK is downloaded by a third-party server 110 from the messaging server 118 or is otherwise received by the third-party server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., applications 106 or applets and the messaging client 104. This provides the user with a seamless experience of communicating with other users on the messaging client 104, while also preserving the look and feel of the messaging client 104. To bridge communications between an external resource and a messaging client 104, in certain examples, the SDK facilitates communication between third-party servers 110 and the messaging client 104. In certain examples, a Web ViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with third-party servers 110. The SDK limits which information is shared based on the needs of the external resource. In certain examples, each third-party server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing section of reading materials such as a page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale applications (e.g., an application 106) are provided with access to a first type of user data (e.g., only two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The voice input system 216 supports system 600 for AR wearable devices. The voice input system 216 receives requests from an AR wearable device and responds to the requests. The requests include sensor data such as an audio data 613 being sent to the voice input system 216 for processing. The input modalities system 216 processes the audio data and identifies actions 643 within the audio data 613 and returns a transcription 656 of the audio data 613, which may include indications of the actions 643. AR wearable devices may request other services from the voice input system 216.

DATA ARCHITECTURE

Figure 3:
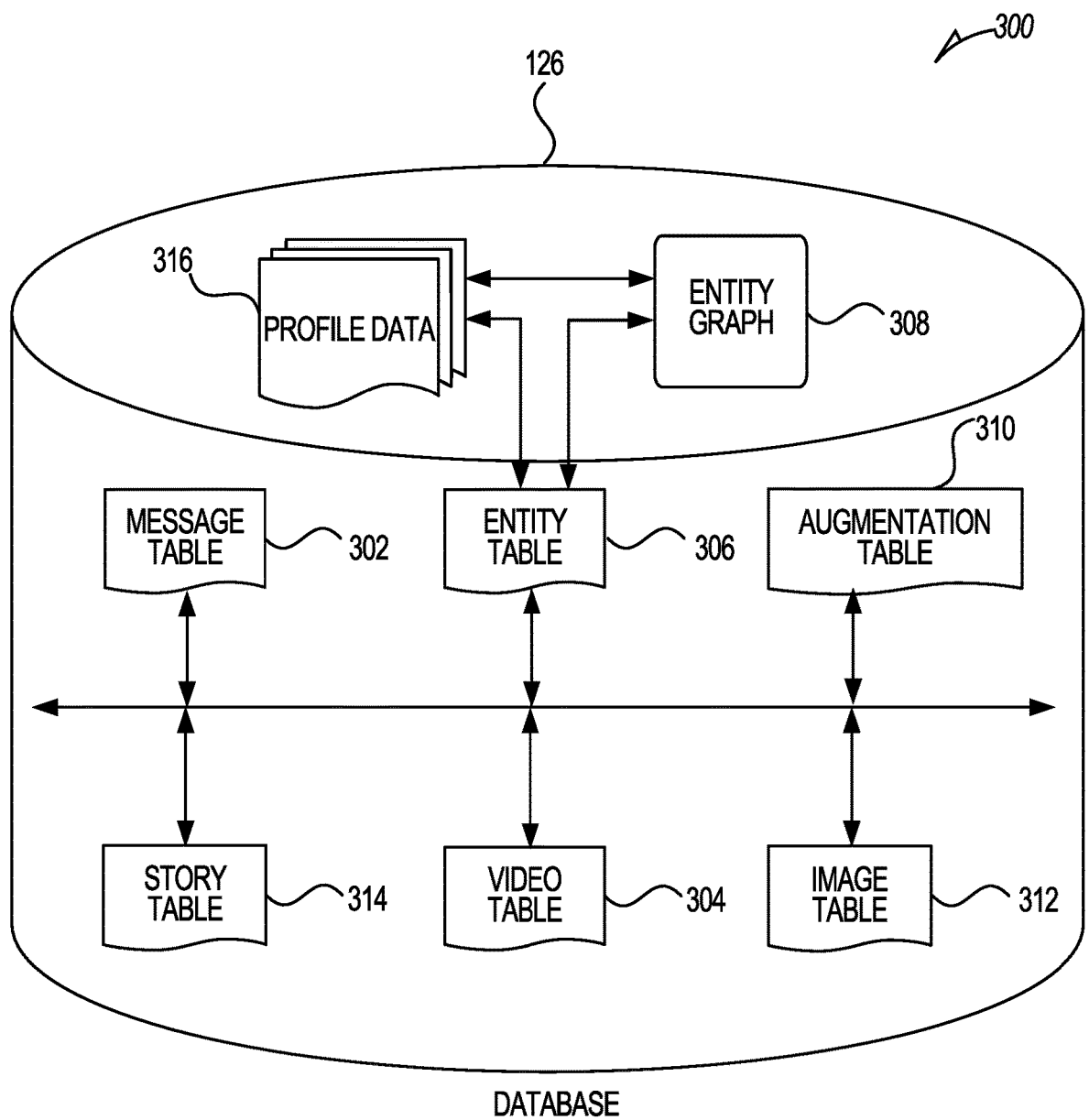
FIG. 3 is a diagrammatic representation of a data structure as maintained in a database, in accordance with some examples.

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302 is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end-user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

DATA COMMUNICATIONS ARCHITECTURE

Figure 4:
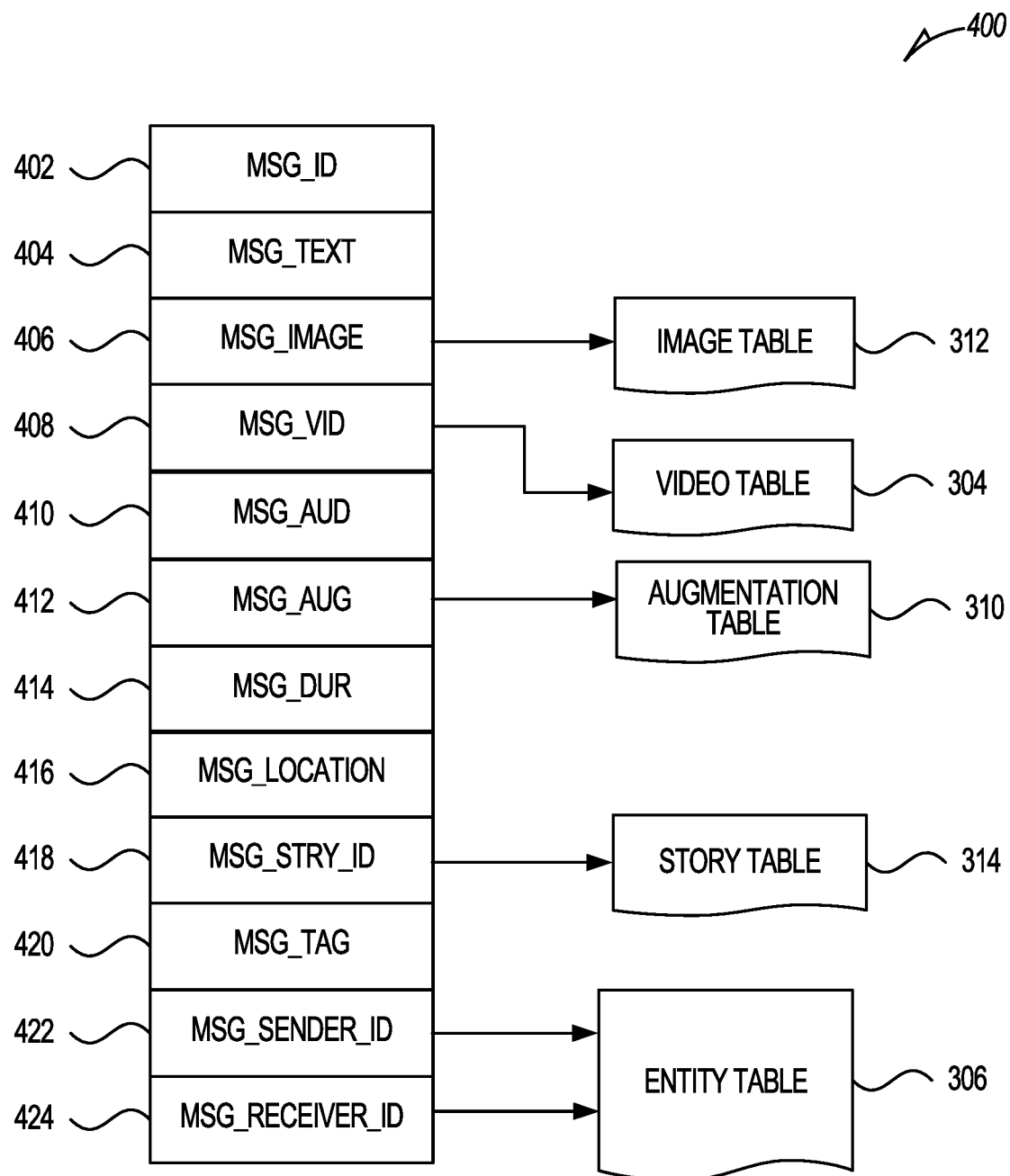
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).
- message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- message sender identifier 422: an identifier (e.g., a messaging system identifier, email address, or device identifier) indicative of a user of the Client device 102 on which the message 400 was generated and from which the message 400 was sent.
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentations 412 may point to data stored in an augmentation table 310, values stored within the message story identifier 418 may point to data stored in a story table 314, and values stored within the message sender identifier 422 and the message receiver identifier 424 may point to user records stored within an entity table 306.

TIME-BASED ACCESS LIMITATION ARCHITECTURE

Figure 5:
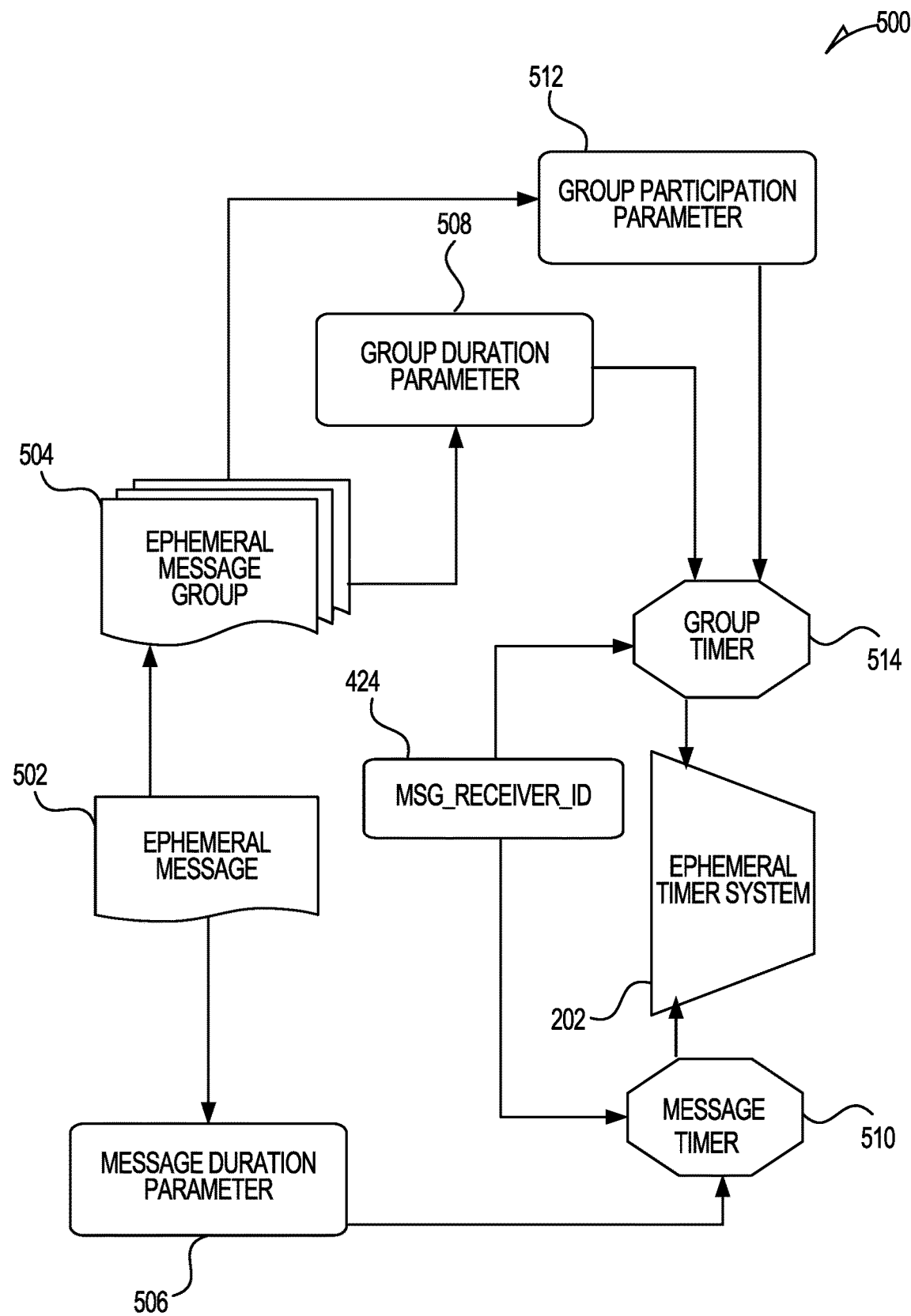
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 510, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 510 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 512, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 512, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 512. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 512. For example, when a sending user has established a group participation parameter 512 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 when either the group participation parameter 512 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 512 for the last remaining ephemeral message 502 within the ephemeral message group 504 will determine when the ephemeral message group 504 itself expires. In this case, a new ephemeral message 502, added to the ephemeral message group 504, with a new group participation parameter 512, effectively extends the life of an ephemeral message group 504 to equal the value of the group participation parameter 512.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

VOICE INPUT FOR AR WEARABLE DEVICES

Figure 6:
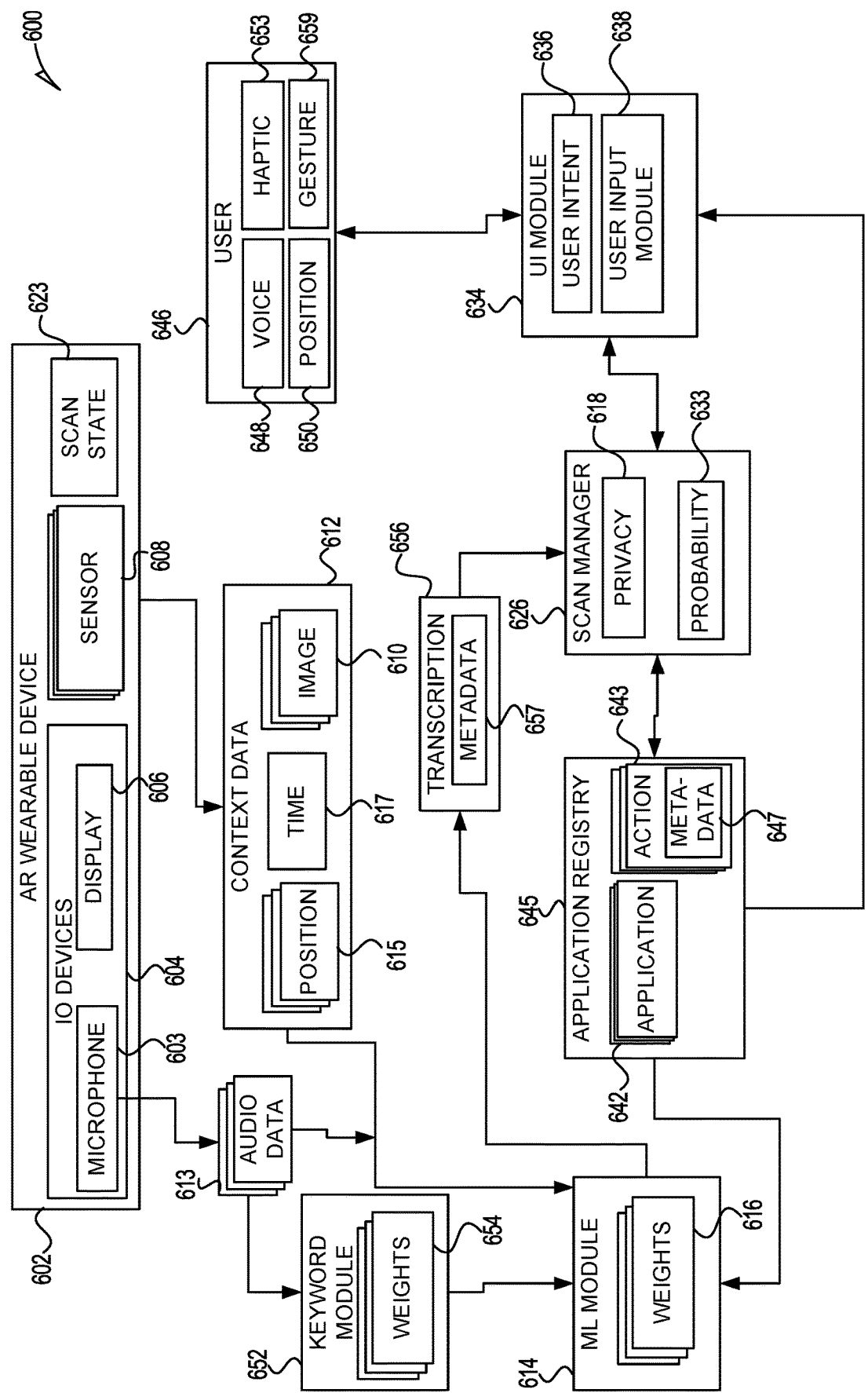
FIG. 6 illustrates a system for providing voice input for AR wearable devices, in accordance with some examples.

FIG. 6 illustrates a system 600 for providing voice input for AR wearable devices, in accordance with some examples. The system 600 includes an AR wearable device such as glasses 1200 of FIG. 10 and may include other devices such as a portion of the messaging server system 108 or the client device 102 that may perform one or more of the operations described herein.

The input/output (IO) devices 604 includes devices that enable a user 646 to receive output or provide input to the system 600. The IO devices 604 include a display 606, a speaker, a microphone 603, a button 1078, a touchpad 1076, a gyroscope, and so forth. Some devices such as a gyroscope can be both a sensor 608 and an IO device 604. For example, the user 646 moving the system 600 communicates input to the system 600. However, the user 646 may move the system 600 without an intent to communicate input to the system 600. The sensors 608 includes a gyroscope, light sensor, an image sensor or camera, a positioning sensor, a clock, and so forth. The sensors 608 includes wireless communications, in accordance with some examples. Wireless communications such as LE Bluetooth, Institute for Electrical and Electronic Engineers (IEEE) 802.11 communication standard, proprietary communications standard, or a 3GPP communications standard can be used to determine a location and/or an orientation of the system 600 so the wireless communication may also be considered a sensor 608. The scan state 623 is stored in a memory of the system 600 and indicates a state of the system 600 for processing audio data 613.

The context data 612 includes data associated with the system 600 and user 646. The data associated with the user 646 includes a profile of the user and other users of the messaging system 100. In some examples, the context data 612 includes information available on the internet. Additionally, the context data 612 includes information available from or generated by the AR wearable device 602. For example, sensors 608 generate position 615 data, time 617 data, and image 610 data. IO devices 604 generate data based on input such as button 1378 of FIG. 13 touches and audio data 613 from the microphone 603. The display 606 is an electronic device for the visual presentation of data such as the visual presentation from an application 642 activity for a user 646. The display 606 is optical elements 1343, 1344 of FIG. 13, in accordance with some examples. The display 606 may be termed an AR display 606.

In some embodiments, there are three scan states 623. An off state where the system 600 does not scan the audio data 613 for actions 643 or a user intent 636. A continuous state where the system 600 continuously scans the audio data 613 for actions 643 or a user intent 636 without regard to a keyword. And a keyword-initiated state where the system 600 scans the audio data 613 for a keyword or a user intent 636, and if the keyword is found, then the audio data 613 after the keyword is processed for actions 643 or a user intent 636. The action 643 may be a command, action 643 phrase, action 643 word, and so forth.

In the keyword-initiated state, the audio data 613 is passed or fed into the keyword module 652, which processes the audio data 613 to identify whether the audio data 613 comprises a keyword. Example keywords include "Hey Spectacles", "Execute Command", "Computer:", and so forth. The keyword can be a phrase, a word, or a sound. In some embodiments, the keyword may be selected by the user 646. The keyword module 652 may be a neural network that is trained to recognize the keyword. The keyword module 652 has weights 654, in accordance with some embodiments. When the keyword module 652 identifies a keyword, it passes the audio data 613 to the machine learning (ML) module 614.

In the continuous state of the scan state 623, the audio data 613 is passed directly to the ML module 614 without first identifying a keyword, in accordance with some embodiments. The ML module 614 is a neural network or other type of machine learning module with weights 616. The ML module 614 takes as input the audio data 613, the context data 612 and/or the application registry 645 and generates as output a transcription 656 of the audio data 613. In some embodiments, the ML module 614 looks for actions 643 within the audio data 613. Some or all of the functions of the ML module 614 may be part of the voice input system 216.

In some embodiments, the keyword module 652 resides within the AR wearable device 602 and the functions of the ML module 614 are performed on a host system such as the voice input system 216 or user device 102. The continuous state of the scan state 623 is energy intensive and places a drain on the battery (not illustrated) of the system 600. So, it is desirable to lessen the amount of time the system 600 is in a scan state 623 where audio data 613 is continuously scanned. The keyword-initiated state of the scan state 623 requires less energy as no analysis of all the audio data 613 is necessary. The keyword module 652 can efficiently scan the audio data 613 for a keyword based on training. The training of the keyword module 652 and/or ML module 614 is performed by the system 600 or a host computer such as voice input system 216. For example, the system 600 or voice input system 216 trains the keyword module 652 to determine weights 654 for a given keyword and/or voice 648 of a user 646. The system 600 or the voice input system 216 trains the ML module 614 to determine weights 616 for the voice 648 of the user 646, in accordance with some embodiments.

The application registry 645 is an association between applications 642 and actions 643. Applications 642 register to be associated with actions 643. In some embodiments, the applications 642 register actions 643 implicitly by defining the actions 643 the applications 642 expose via a settings file bundled with the application 642. The system 600 then builds the application registry 645 when the system 600 boots up. Additionally, applications 642 may be downloaded after boot-up and have their actions 643 added to the application registry 645.

When the scan manager 626 determines that an action 643 is part of the transcription 656, then the scan manager 626 considers all the applications 642 that are associated with that action 643. The UI module 634 provides a user interface for the user 646 to associate actions 643 with an application 642 as discussed in conjunction with FIG. 10. In some embodiments, the actions 643 are associated with metadata 657. For example, an action such as "play" may be associated with metadata 657 that indicates a band name or a song name is likely to follow "play". For example, action 643 is "play <band name song name>".

An application 642 may be associated with more than one action 643 and an action 643 may be associated with more than one application 642. For example, a music player application 642 associates with actions 643 such as "play", "next song", "stop", and so forth. A full command to the system 600 is "Hey Spectacles, next song." Where the keyword module 652 identifies the keyword "Hey Spectacles," and activates the ML module 614 by passing the audio data 613 after "Hey Spectacles" to the ML module 614. The ML module 614 generates the transcription of "next song," which is passed to the scan manager 626. The ML module 614 may use the actions 643 that have current associations with application 642 to aid in determining the transcription 656.

Additionally, the ML module 614 provides information or metadata 657 regarding words or phrases in the transcription 656. For example, for the utterance "Hey Spectacles, play 'Pop Star name'", the ML module 614 generates a transcription 656 with metadata 657 indicating that "play" is an action 643 and that "Pop Star Name" is a proper name or a pop star name. The ML module 614 uses the metadata 647 associated with the action 643 to determine the metadata 657. Scan manager 626 uses the metadata 657 in determining the application 642 that was intended by the user 646.

In another example, for the utterance "Hey Spectacles, convert 5 meters to feet," the ML module 614 generates a transcription 656 with "convert" identified as an action 643 and "5 meters to feet" identified as a number, a first measuring unit, and a second measuring unit. The metadata 647 associated with the action 643 includes information that indicates that after the action 643 "convert" that there will be a number, a first measuring system, and a second measuring system. Scan manager 626 uses the transcription 656 and metadata 657 to determine which application 642 or applications 642 to run or present to the user 646.

In another example, for the utterance "Hey Spectacles, select a sweet white wine," the ML module 614 generates a transcription 656 with "select" identified as an action 643 and "a sweet white wine" identified as a noun phrase indicating a type of a "wine". The metadata 647 associated with the action 643 includes information that after the action 643 "select" that there will be a noun, which may include enumerated objects such as "wine", "beer", "peanut butter", and so forth, that the application 642 is capable of "select [ing]".

In another example, for the utterance "Hey Spectacles, select a sweet white wine," the keyword module 652 identifies the keyword "Hey Spectacles," which then passes the audio data 613 to the ML module 614. The ML module 614 processes the audio data 613 to determine an action 643 such as "select." The scan manager 626 determines the application 642 based at least on the action 643. The scan manager 626 then invokes the application 642 with the audio data 613, which may have been truncated to remove the keyword and the action 643. For example, continuing with the above example, the audio data 613 would include "a sweet white wine" or "select a sweet white wine" depending on whether the audio data 613 was truncated or not. The application 642 then determines how to process the audio data 613 or control the processing of the audio data 613.

The application 642 for "select[ing]" the "wine" captures an image 610 or uses a previously captured image 610 and segments the image 610 into the different wine bottle labels in the image 610. The application 642 then displays a marker over a suggested bottle of wine or causes the name of the wine to be played over a speaker of the AR wearable device 602.

The scan manager 626 accesses the transcription 656 and the application registry 645 to determine whether to run an application 642, present an application 642 for confirmation from the user 646, or to present a list of applications 642 for the user 646 to select from. The scan manager 626 determines which actions 643 are present in the transcription 656. The scan manager 626 evaluates which applications 642 would most likely satisfy the user intent 636. The scan manager 626 performs one or more of the following actions to determine the probability 633 that an application 642 and action 643 match the user intent 636. The user intent 636 represents what the user 646 had intended or would like based on the audio data 613.

If there are multiple actions 643 and/or multiple applications 642 associated with the action 643, then the scan manager 626 compares the metadata 647 to the metadata 657. The metadata 647 is specific to a particular application 642, so if the metadata 647 matches the metadata 657, then the scan manager 626 increases the probability 633 that the user intent 636 was to execute the application 642 associated with the matching metadata 647. For example, there may be two applications associated with the action 643 "select". The metadata 647 for one may be "select <"wine"|"beer">" and the metadata for the other may be "select <street name 1>& <street name 2>". The metadata 657 may indicate a match with "select wine", so the application 642 for selecting wine is given a higher probability of satisfying the user intent 636.

Additionally, the scan manager 626 may execute the application 642 with the transcription 656 and the application 642 may return a value indicating whether the transcription 656 includes valid or invalid parameters for the application 642. The scan manager 626 may use this information to determine a probability that the application 642 will satisfy the user intent 636. Moreover, the scan manager 626 may use additional information available in the system 600. For example, in some embodiments, the system 600 identifies objects within the images 610. The scan manager 626 may adjust the probabilities 633 based on a relationship between the identified objects and the applications 642 and/or actions 643. For example, if objects are identified in the image 610 that include wine bottles and the metadata 647 indicates that a name of a wine may be included after the action 643, then the probability 633 is increased for the action 643 associated with the metadata 647. The scan manager 626 evaluates the probabilities 633 for each eligible application 642 and action 643.

If the probability 633 is greater than or transgresses a threshold value for an action 643 and application 642, then the scan manager 626, executes the application 642 without additional user 646 input. If there are multiple applications 642 and/or actions 643, and none of the associated probabilities 633 are greater than or transgress the threshold, then the scan manager 626 passes a list of the actions 643 and associated applications 642 to the user interface (UI) module 634 to determine the user intent 636.

When the application 642 is executed by the scan manager 626, the application 642 has access to one or more of the following: the audio data 613, the transcription 656, the context data 612, and an input from the user 646. In some embodiments, the scan manager 626 maintains a privacy 618 for the user 646. The scan manager 626 may query the user 646 whether an application 642 may be executed and whether an application 642 may access data associated with the user 646.

In some embodiments, access to data associated with the user 646 has multiple levels of privacy 618. For example, at one level of privacy 618 the actual audio data 613 may be accessed and at a lower level of privacy 618 only the transcription 656 may be accessed. Access to the transcription 656 is less intrusive than access to the audio data 613. An application 642 may be granted a level of privacy 618 which is typically the lowest level needed for the application 642 to perform its functions. In some embodiments, applications 642 are required or encouraged to request the lowest level of privacy 618 needed to perform their actions. The each of the context data 612 is assigned a level of privacy 618, in accordance with some embodiments.

The UI module 634 presents the actions 643 and/or applications 642 to either confirm a default selection or for the user 646 to select an action 643 and/or application 642. The UI module 634 determines a user intent 636 based on input from the user 646. The user input module 638 manages the input from the user 646. The input from the user 646 may be indicated based on a voice 648 of the user 646, a position 650 of the user 646 changing or remaining the same, a haptic 653 input from the user 646 such as a button press, and/or a gesture 659 from the user 646 such as a circling of an indication of an application 642 by a finger of the user 646. The action 643 word or phrase may be spoken by the user 646 with their voice 648.

Figure 7:
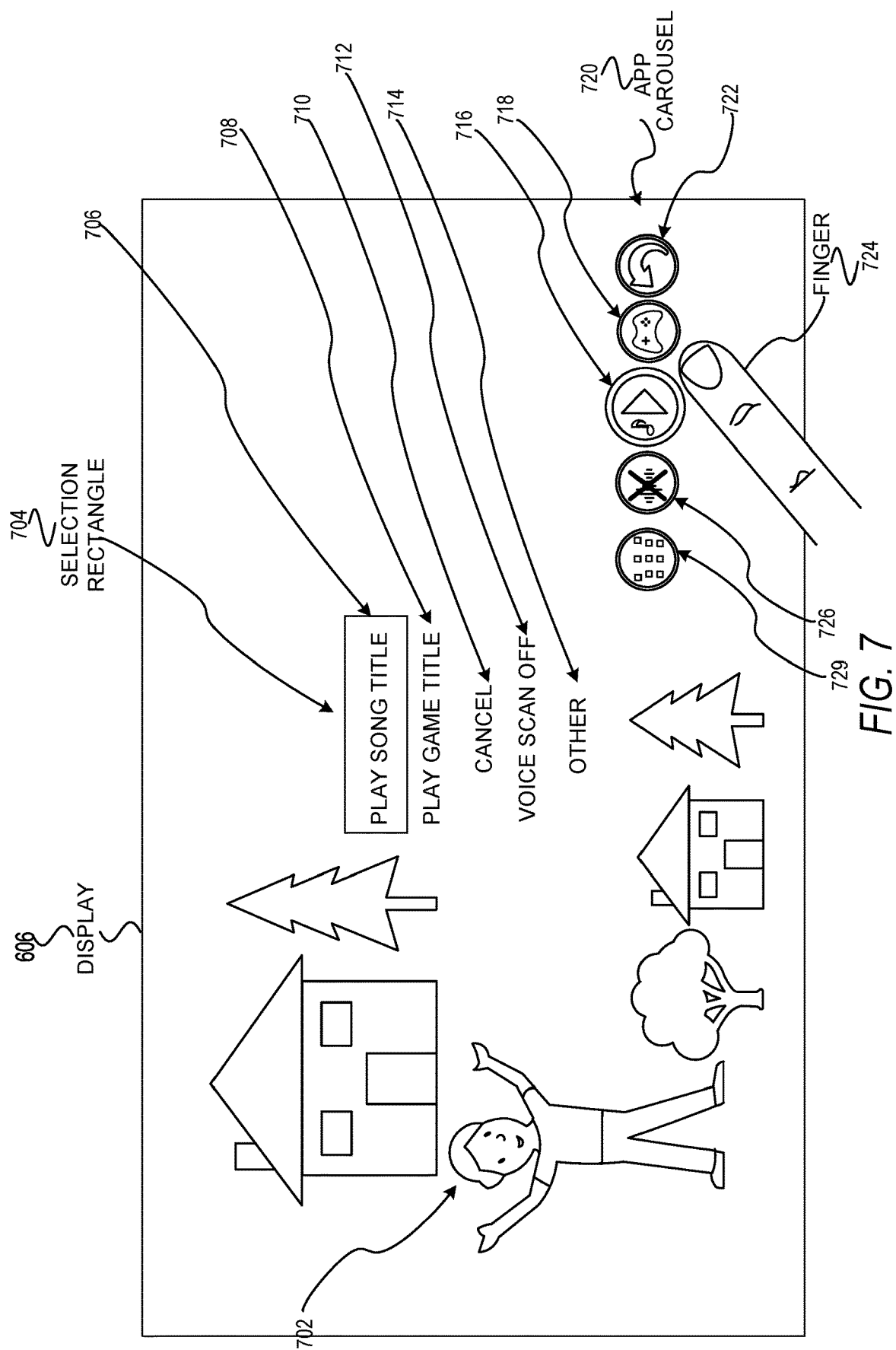
FIG. 7 illustrates the display of the system with indications of applications, in accordance with some embodiments.

FIG. 7 illustrates the display 606 of the system 600 with indications of applications, in accordance with some embodiments. For example, a user may see a person 702 standing in a neighborhood. The user 646 (not visible) says "Hey Spectacles, play 'song name'". The keyword module 652 identifies "Hey Spectacles" within the audio data 613 and sends the audio data 613, which may be edited to remove "Hey Spectacles", to the ML module 614. The system 600 may send the audio data 613 wirelessly to an ML module 614 residing on a host device such as the voice input system 216 or client device 102. The ML module 614 generates the transcription 656, which may be transmitted to the system 600 wirelessly by the voice input system 216 or client device 102.

The scan manager 626 determines that the transcription 656 includes the action 643 "play". The scan manager 626 determines that there are two applications 642 associated with the action 643 "play". The scan manager 626 determines that the probability that the application 642 to "play" a song is not greater than or does not transgress a threshold value, so the scan manager 626 sends the two application 642 to the UI module 634.

The UI module 634 displays on the display 606 "play song title" 706, "play game title" 710, "cancel" 712, "voice scan on" 714, and "other" 714. The UI module 634 displays the options on the display 606 as illustrated and/or displays 606 an application carousel 720 where icon 729 corresponds to "other" 714, icon 726 corresponds to "cancel" 712, icon 716 corresponds to "play song title", icon 718 corresponds to "play game title" 710, and icon 722 corresponds to "cancel" 710. The user input module 638 determines the user intent 636 or selection of the possible options. The user 646 may indicate a selection using their voice 648, moving the selection rectangle 704 over the option by moving or tilting their head, using a haptic 653 control, or by a gesture 659 such as with an appendage such as their finger 724 virtually pushing or selecting one of the icons. For example, the UI module 634 identifies the input of the user 646 as the selection of the application 642, "play song title" 706, based on the indication of the application, "play song title" 706, being within the selection shape, the selection rectangle 704. In some embodiments, a position of the selection rectangle 704 remains stable as the AR wearable device 602 moves and positions of the indications of the one or more applications move in accordance with movement of the AR wearable device 602. In this way, the user 646 can move their head up or down to select the application 642.

The UI module 634 sends the user intent 636 or selection to the scan manager 626. The scan manager 626 may determine whether the privacy 618 of the user 646 is satisfied before executing or running the application 642 with the transcription 656 and context data 612. For example, the user 646 may grant permission for an application 642 to access the transcription 656 and/or context data 612. The "game title" may have been an AR game that interacted with the environment as seen in the display 606. For example, graphics may be added to augment the trees to indicate a list of possible species of trees. The user 646 would guess the proper species of the trees.

Figure 8:
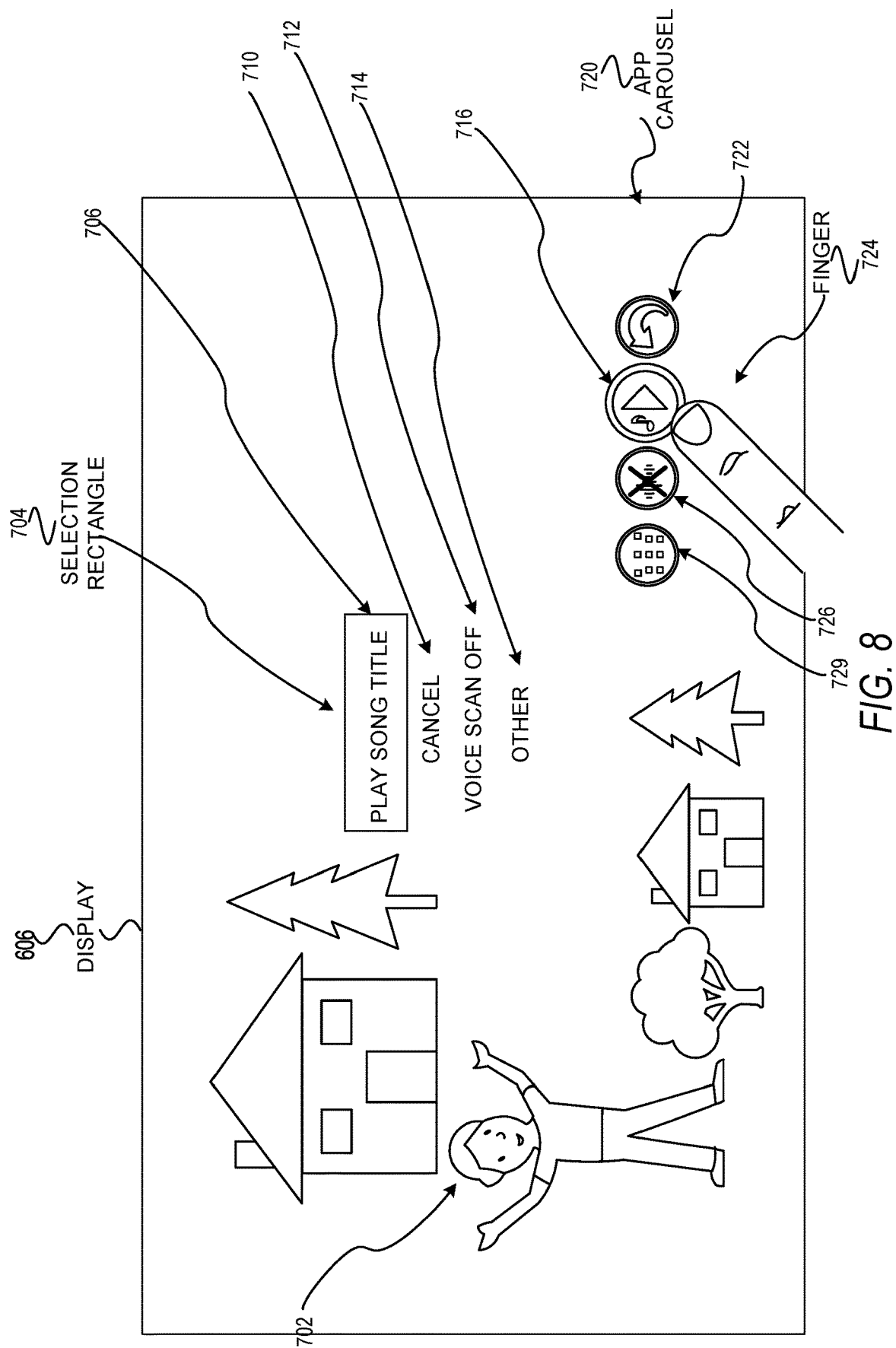
FIG. 8 illustrates the display of the system with an indication of an application, in accordance with some embodiments.

FIG. 8 illustrates the display 606 of the system 600 with an indication of an application, in accordance with some embodiments. FIG. 8 is similar to FIG. 7 but illustrates the case where only one application 642 matched the action 643 "play". The scan manager 626 determined that the probability was not greater than or did not transgress a threshold value for executing or running the application 642 without confirming first that the user intent 636 was to execute or run the application 642 to "play song title" 706. The user 646 confirms or selects one of the options displayed on the display 606 as described in FIG. 7.

Figure 9:
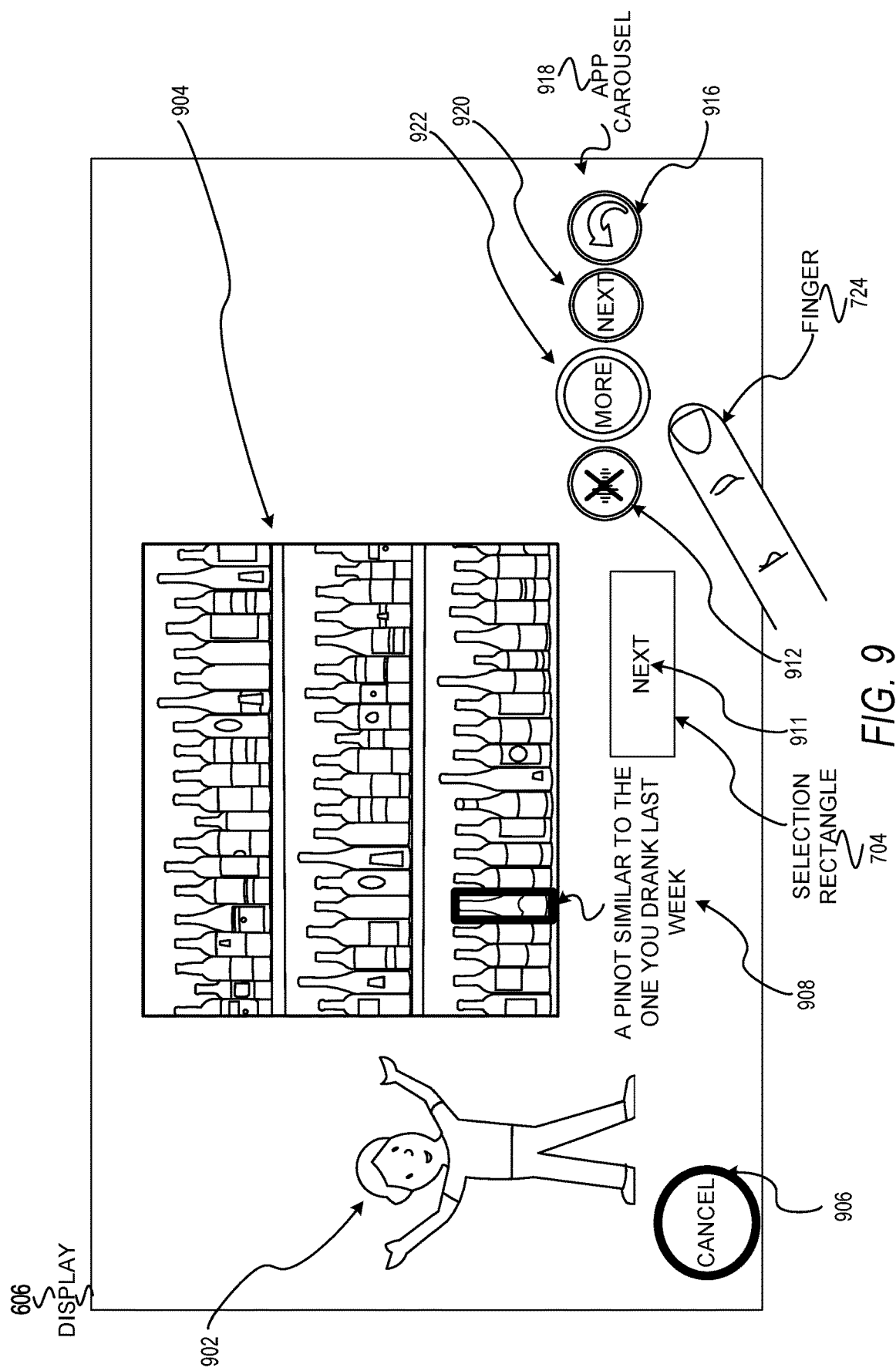
FIG. 9 illustrates an application, in accordance with some embodiments.

FIG. 9 illustrates an application 642, in accordance with some embodiments. A wine selection application 642 is executed or run when the user 646 is in a wine store where wine 904 and wine clerk 902 are visible. The user 646 spoke "Hey Spectacles, select wine". The scan manager 626 determined the application from the action 643 "select", the metadata 647, and a position 615 that indicated the user 646 was inside a wine store. The scan manager 626 executed or ran the application 642 without confirmation from the user 646 because the probability that the user intent 636 was to execute or run the selection application 642 associated with the action 643 "select" was greater than or transgressed a threshold value. The application 642 provides a recommendation 908 for a wine and provides options that include "next" 911, which when selected provides a next best recommendation 908 for another wine. The application 642 accesses an image 610 and segments the image to determine the wines that are available at the store. The application 642 additionally may access the internet and use information available on a store website to aid in making the recommendation 908. Additionally, the user 646 may select to "cancel" 906 the application 642. An application carousel 918 may be offered as well. With icon 916 corresponding to "cancel" 906, icon 920 "next" corresponding to "next" 911, icon 922 "more" providing additional options, and icon 912 turning off voice scan. The user 646 indicates the user intent 636 as disclosed herein.

Figure 10:
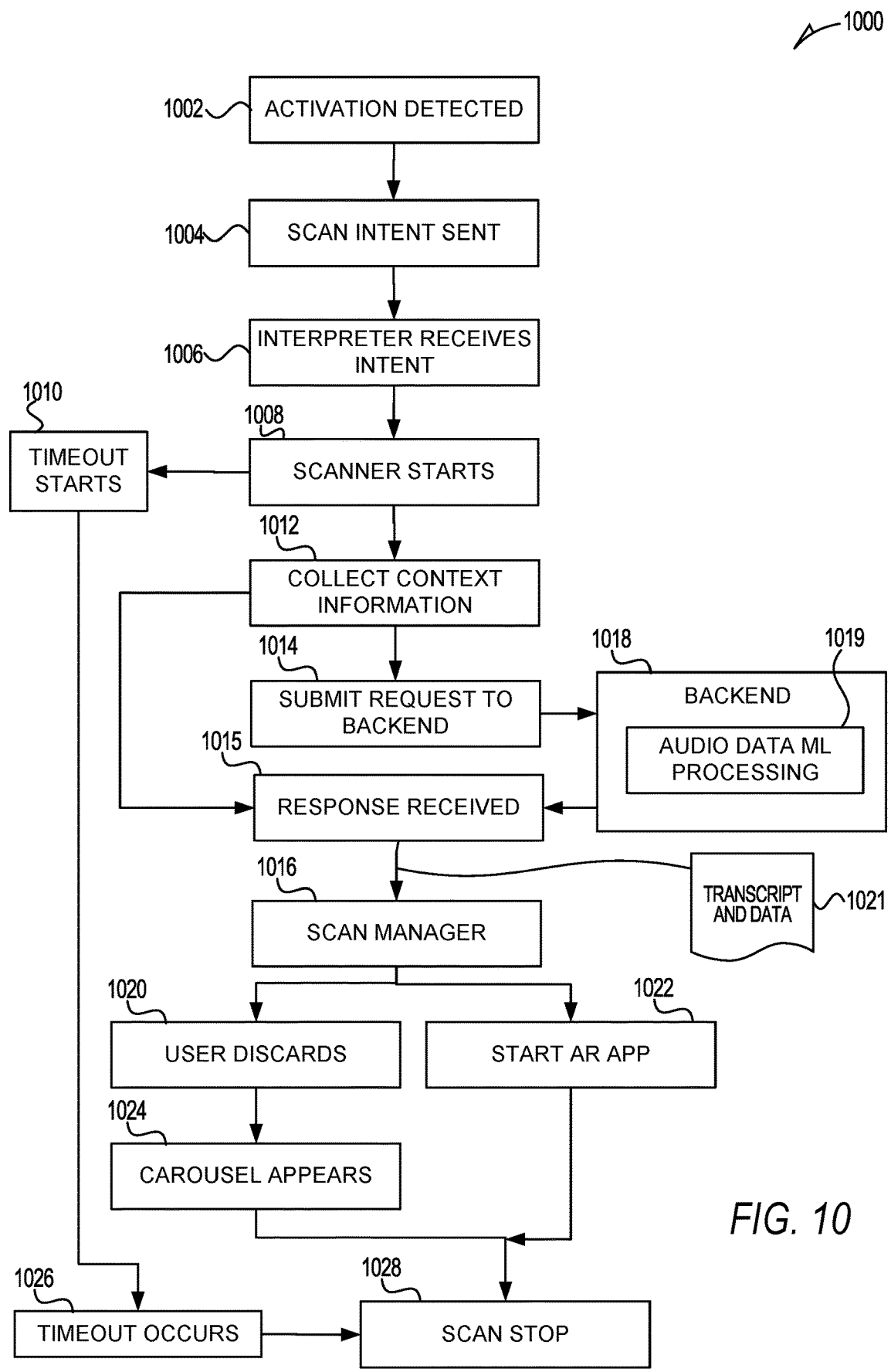
FIG. 10 illustrates a method for voice input for AR wearable devices, in accordance with some embodiments.

FIG. 10 illustrates a method 1000 for voice input for AR wearable devices, in accordance with some embodiments. The method 1000 begins at operation 1002 with detecting an activation. For example, the keyword module 652 is monitoring the audio data 613 and detects "Hey Spectacles."

The method 1000 continues at operation 1004 with sending the scan intent. For example, the keyword module 652 sends to the ML module 614 an indication that the keyword has been detected in the audio data 613. In some embodiments, when the keyword module 652 has detected the keyword, then an indication that the keyword has been detected is communicated to the user 646. For example, by vocalizing or displaying "please speak comment".

The method 1000 continues at operation 1006 with the interpreter receiving the intent. For example, the ML module 614 receives the indication that the keyword has been detected in the audio data 613. The method 1000 continues at operation 1008 with starting the scanner. For example, the ML module 614 collects the audio data 613 after the keyword. The method 1000 continues at operation 1012 with collecting context information. For example, the ML module 614 collects context data 612, which may include sending a command to the image capturing device to capture an image 610.

The method 1000 continues at operation 1014 with submitting a request to a backend 1018. For example, the ML module 614 may transmit a request using wireless communications to an application server 114 and/or a client device 102. The AR wearable device 602 makes a wireless connection with the host system such as the application server 114 or client device 102. The method 1000 continues at operation 1019 with processing, using a machine learning model, the audio data. For example, ML module 614 processes the audio data 613 as described in conjunction with FIG. 6 and herein. The ML module 614 may reside remotely or locally on the AR wearable device 602.

The method 1000 continues at operation 1015 with receiving a response. For example, the ML module 614 has finished processing the audio data 613. When the ML module 614 is located remotely, then it sends a signal to the AR wearable device 602 indicating that it has completed processing. The ML module 614 sends the transcript and data 1021 to the scan manager.

The method 1000 continues at operation 1016 with executing the scan manager. For example, the scan manager 626 receives the transcription 656 and determines whether to execute or run an application 642 or not as described in conjunction with FIG. 6 and herein.

The method 1000 continues at operation 1020 with the user discarding the application 642. For example, the user 646 may determine to "cancel" 710 rather than run an application 642. In some embodiments, the method 1000 continues with a carousel appearing 1024. For example, an application carousel 720 may be displayed on the display 606 offering the user 646 various options such as to display a menu to select an application 642.

The method 1000 continues at operation 1022 with starting an application if the user does not discard the option of executing or running an application 642. For example, the scan manager 626 may execute the selected application 642 with first insuring that privacy 618 criteria are satisfied.

The method 1000 continues from operations 1022, 1024, and 1026 at operation 1028 with stopping scanning. For example, the ML module 614 may no longer examine the audio data 613. The keyword module 652 continues to scan the audio data 613 for another instance of the keyword.

In some embodiments, the method 1000 continues from operation 1008 at operation 1010 with starting a timeout. For example, the ML module 614 may start a timeout threshold in processing the audio data 613. The method 1000 continues at operation 1026 with a timeout occurring. For example, if no new audio data 613 is received after the keyword, then the ML module 614 determines a timeout has occurred. The method 1000 may return to operation 1002.

The method 1000 may include one or more additional operations. Operations of method 1000 may be performed in a different order. One or more of the operations of method 1000 may be optional. The method 1000 may be performed by the client device 102, system 600, glasses 1200, or another electronic device. Portions of the functionality may be performed on a server computer or host computer. For example, glasses 900 may be coupled to a host client device 102 or application server 114 where one or more of the operations are performed.

Figure 11:
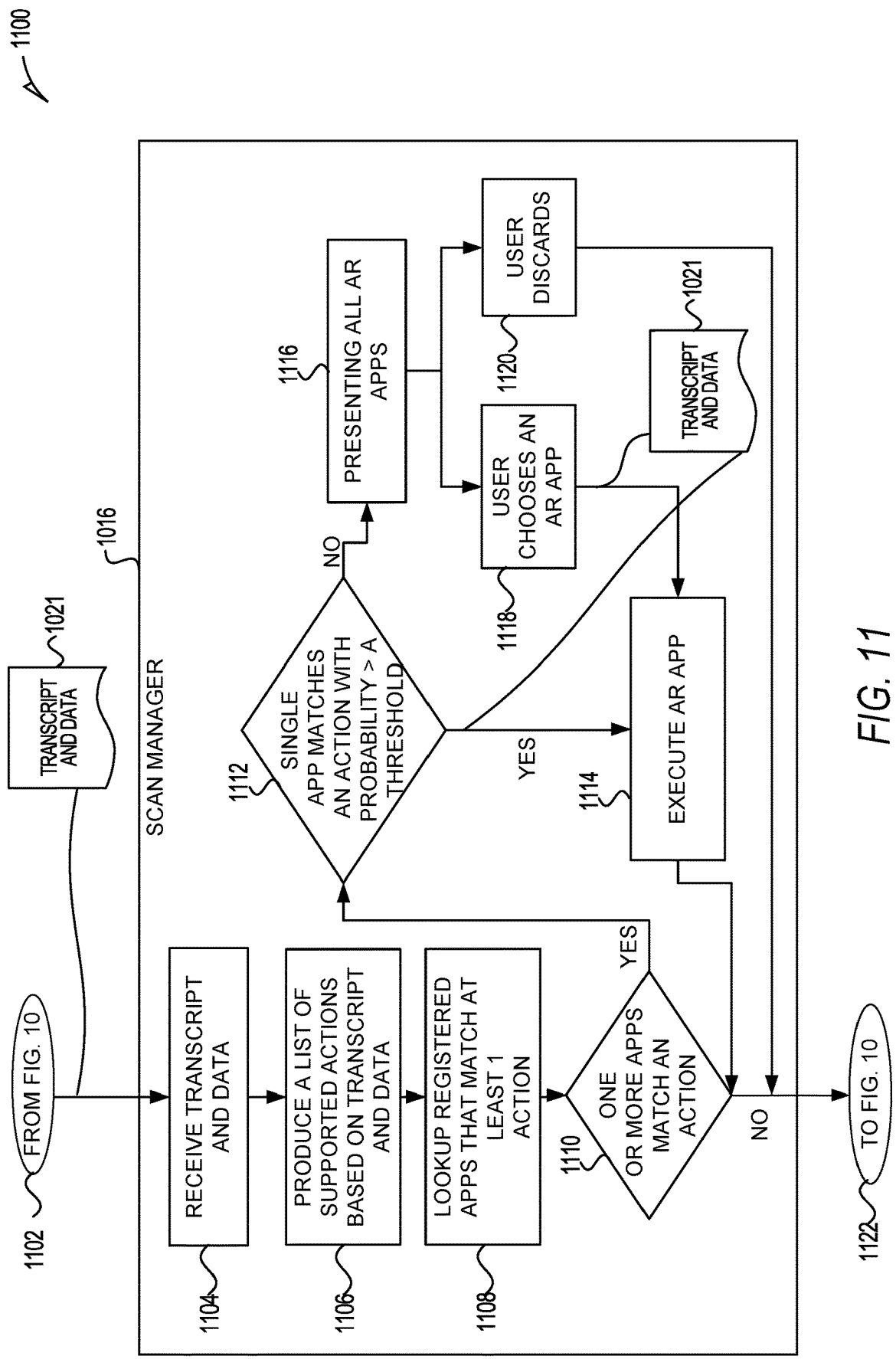
FIG. 11 illustrates a method for the operation scan manger, in accordance with some embodiments.

FIG. 11 illustrates a method 1100 for the operation scan manager, in accordance with some embodiments. The method 1100 is an expansion of the operation scan manager and begins with coming from FIG. 10 1102 and ends with returning to FIG. 10 1122. The method 1100 continues at operation 1104 with receiving transcript and data. For example, the scan manager 626 receives transcription 656 and may access the context data 612.

The method 1100 continues at operation 1106 with producing a list of supported actions based on the transcript and data. For example, scan manager 626 produces a list of actions based on the transcription 656 and the application registry 645 where other data such as the context data 612 is used in some embodiments.

The method 1100 continues at operation 1108 with looking up registered applications that match at least one action. For example, the scan manager 626 may search the application registry 645 to determine which applications 642 are associated with one of actions 643.

The method 1100 continues at operation 1110 with determining whether one or more applications match an action. If there are no applications, that match an action 643 in the transcription 656, then the method 1100 returns to FIG. 10. If there are one or more applications 642 that match an action 643 in the transcription 656, then the method 1100 continues to operation 1112 with determining whether a single application matches an action with a probability greater than a threshold.

If the determination is successful, then the method 1100 continues at operation 1114 with starting the application. For example, FIG. 9 illustrates a wine selection application 642 that was executed based on the probability that the user intent 636 was to execute the application 642 being greater than or transgressing a threshold.

If the determination at operation 1112 is unsuccessful, then the method 1100 continues at operation 1116 with presenting all the AR applications. For example, FIG. 7, illustrates where two applications 642 are presented to the user 646. When the user chooses an AR application, then the method 1100 continues at operation 1118 with the user choosing an AR app. For example, FIG. 7 illustrates the user 646 choosing or selecting "play song title" 706 where the action 643 is "play". If the user 646 does not select an AR application, then the method 1100 continues at operation 1120 with the user discarding the AR applications. For example, the user 646 in FIG. 7 may select "cancel" 710, which would discard the applications 642. The method 1100 returns to FIG. 10 1122.

The method 1100 may include one or more additional operations. Operations of method 1100 may be performed in a different order. One or more of the operations of method 1100 may be optional. The method 1100 may be performed by the client device 102, system 600, glasses 1200, or another electronic device. Portions of the functionality may be performed on a server computer or host computer. For example, glasses 900 may be coupled to a host client device 102 or application server 114 where one or more of the operations are performed.

Figure 12:
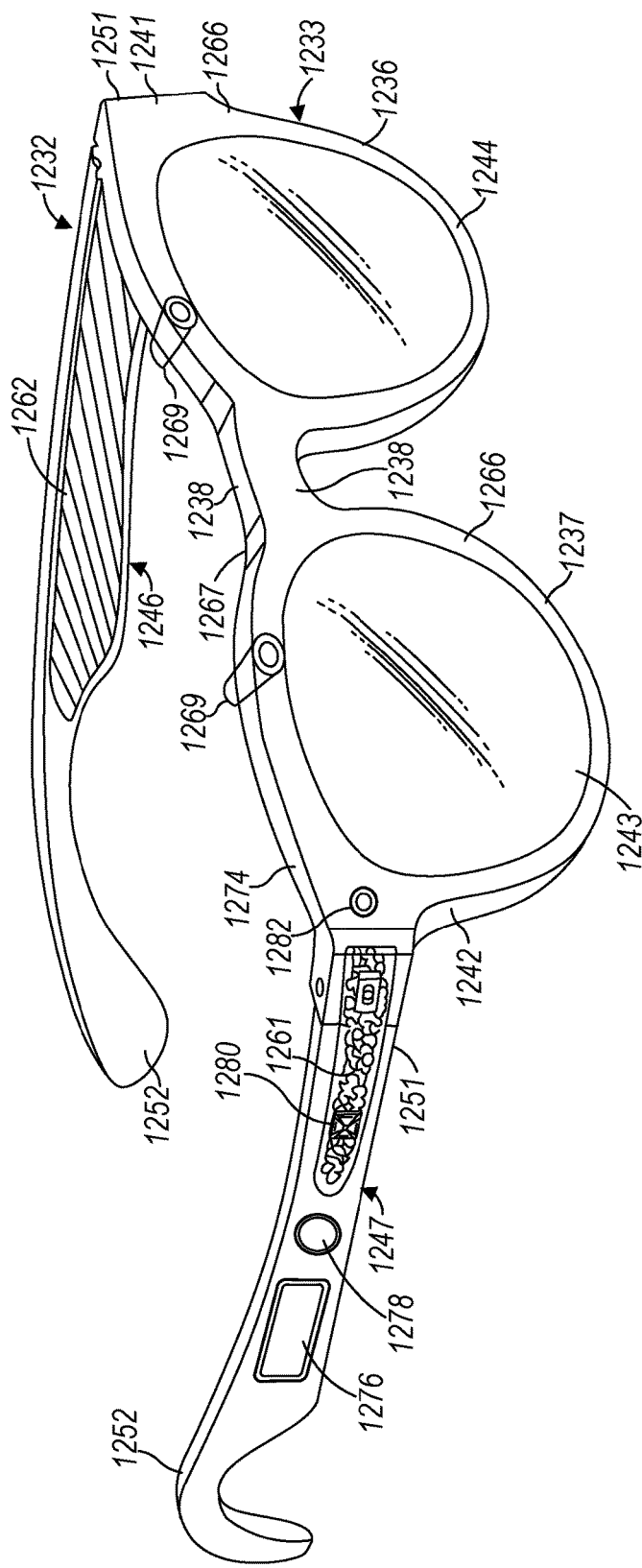
FIG. 12 is a perspective view of a wearable electronic device in the form of glasses 1200, in accordance with some examples.

FIG. 12 is a perspective view of a wearable electronic device in the form of glasses 1200, in accordance with some examples. The glasses 1200 are an article of eyewear including electronics, which operate within a network system for communicating image and video content. In some examples, the wearable electronic device is termed AR glasses. The glasses 1200 can include a frame 1232 made from any suitable material such as plastic or metal, including any suitable shape memory alloy. The frame 1232 can have a front piece 1233 that can include a first or left lens, display, or optical element holder 1236 and a second or right lens, display, or optical element holder 1237 connected by a bridge 1238. The front piece 1233 additionally includes a left end portion 1241 and a right end portion 1242. A first or left optical element 1244 and a second or right optical element 1243 can be provided within respective left and right optical element holders 1236, 1237. Each of the optical elements 1243, 1244 can be a lens, a display, a display assembly, or a combination of the foregoing. In some examples, for example, the glasses 1200 are provided with an integrated near-eye display mechanism that enables, for example, display to the user of preview images for visual media captured by cameras 1269 of the glasses 1200.

The frame 1232 additionally includes a left arm or temple piece 1246 and a right arm or temple piece 1247 coupled to the respective left and right end portions 1241, 1242 of the front piece 1233 by any suitable means such as a hinge (not shown), so as to be coupled to the front piece 1233, or rigidly or fixedly secured to the front piece 1233 so as to be integral with the front piece 1233. Each of the temple pieces 1246 and 1247 can include a first portion 1251 that is coupled to the respective end portion 1241 or 1242 of the front piece 1233 and any suitable second portion 1252, such as a curved or arcuate piece, for coupling to the ear of the user. In one example, the front piece 1233 can be formed from a single piece of material, so as to have a unitary or integral construction. In one example, the entire frame 1232 can be formed from a single piece of material so as to have a unitary or integral construction.

The glasses 1200 include a computing device, such as a computer 1261, which can be of any suitable type so as to be carried by the frame 1232 and, in one example, of a suitable size and shape, so as to be at least partially disposed in one or more of the temple pieces 1246 and 1247. In one example, the computer 1261 has a size and shape similar to the size and shape of one of the temple pieces 1246, 1247 and is thus disposed almost entirely if not entirely within the structure and confines of such temple pieces 1246 and 1247.

In one example, the computer 1261 can be disposed in both of the temple pieces 1246, 1247. The computer 1261 can include one or more processors with memory, wireless communication circuitry, and a power source. The computer 1261 comprises low-power circuitry, high-speed circuitry, location circuitry, and a display processor. Various other examples may include these elements in different configurations or integrated together in different ways. Additional details of aspects of the computer 1261 may be implemented as described with reference to the description that follows.

The computer 1261 additionally includes a battery 1262 or other suitable portable power supply. In one example, the battery 1262 is disposed in one of the temple pieces 1246 or 1247. In the glasses 1200 shown in FIG. 12, the battery 1262 is shown as being disposed in the left temple piece 1246 and electrically coupled using a connection 1274 to the remainder of the computer 1261 disposed in the right temple piece 1247. One or more input and output devices can include a connector or port (not shown) suitable for charging a battery 1262 accessible from the outside of the frame 1232, a wireless receiver, transmitter, or transceiver (not shown), or a combination of such devices.

The glasses 1200 include digital cameras 1269. Although two cameras 1269 are depicted, other examples contemplate the use of a single or additional (i.e., more than two) cameras 1269. For ease of description, various features relating to the cameras 1269 will be described further with reference to only a single camera 1269, but it will be appreciated that these features can apply, in suitable examples, to both cameras 1269.

In various examples, the glasses 1200 may include any number of input sensors or peripheral devices in addition to the cameras 1269. The front piece 1233 is provided with an outward-facing, forward-facing, front, or outer surface 1266 that faces forward or away from the user when the glasses 1200 are mounted on the face of the user, and an opposite inward-facing, rearward-facing, rear, or inner surface 1267 that faces the face of the user when the glasses 1200 are mounted on the face of the user. Such sensors can include inward-facing video sensors or digital imaging modules such as cameras 1269 that can be mounted on or provided within the inner surface 1267 of the front piece 1233 or elsewhere on the frame 1232 so as to be facing the user, and outward-facing video sensors or digital imaging modules such as the cameras 1269 that can be mounted on or provided with the outer surface 1266 of the front piece 1233 or elsewhere on the frame 1232 so as to be facing away from the user. Such sensors, peripheral devices, or peripherals can additionally include biometric sensors, location sensors, accelerometers, or any other such sensors. In some examples, projectors (not illustrated) are used to project images on the inner surface of the optical elements 1243, 1244 (or lenses) to provide a mixed reality or augmented reality experience for the user of the glasses 1200.

The glasses 1200 further include an example of a camera control mechanism or user input mechanism comprising a camera control button mounted on the frame 1232 for haptic or manual engagement by the user. The camera control button provides a bi-modal or single-action mechanism in that it is disposable by the user between only two conditions, namely an engaged condition and a disengaged condition. In this example, the camera control button is a push button that is by default in the disengaged condition, being depressible by the user to dispose it to the engaged condition. Upon release of the depressed camera control button, it automatically returns to the disengaged condition.

In other examples, the single-action input mechanism can instead be provided by, for example, a touch-sensitive button comprising a capacitive sensor mounted on the frame 1232 adjacent to its surface for detecting the presence of a user's finger, to dispose the touch-sensitive button to the engaged condition when the user touches a finger to the corresponding spot on the outer surface 1266 of the frame 1232. It will be appreciated that the above-described camera control button and capacitive touch button are but two examples of a haptic input mechanism for single-action control of the camera 1269, and that other examples may employ different single-action haptic control arrangements.

The computer 1261 is configured to perform the methods described herein. In some examples, the computer 1261 is coupled to one or more antennas for reception of signals from a GNSS and circuitry for processing the signals where the antennas and circuitry are housed in the glasses 1200. In some examples, the computer 1261 is coupled to one or more wireless antennas and circuitry for transmitting and receiving wireless signals where the antennas and circuitry are housed in the glasses 1200. In some examples, there are multiple sets of antennas and circuitry housed in the glasses 1200. In some examples, the antennas and circuitry are configured to operate in accordance with a communication protocol such as Bluetooth™, Low-energy Bluetooth™, IEEE 802, IEEE 802.11az/be, and so forth. In some examples, PDR sensors housed in glasses 1200 and coupled to the computer 1261. In some examples, the glasses 1200 are VR headsets where optical elements 1243, 1244 are opaque screens for displaying images to a user of the VR headset. In some examples, the computer 1261 is coupled to user interface elements such as slide or touchpad 1276 and button 1278. A long press of button 1278 resets the glasses 1200. The slide or touchpad 1276 and button 1278 are used for a user to provide input to the computer 1261 and/or other electronic components of the glasses 1200. The glasses 1200 include one or more microphones 1282 that are coupled to the computer 1261. The glasses 1200 include one or more gyroscopes 1280.

Figure 13:
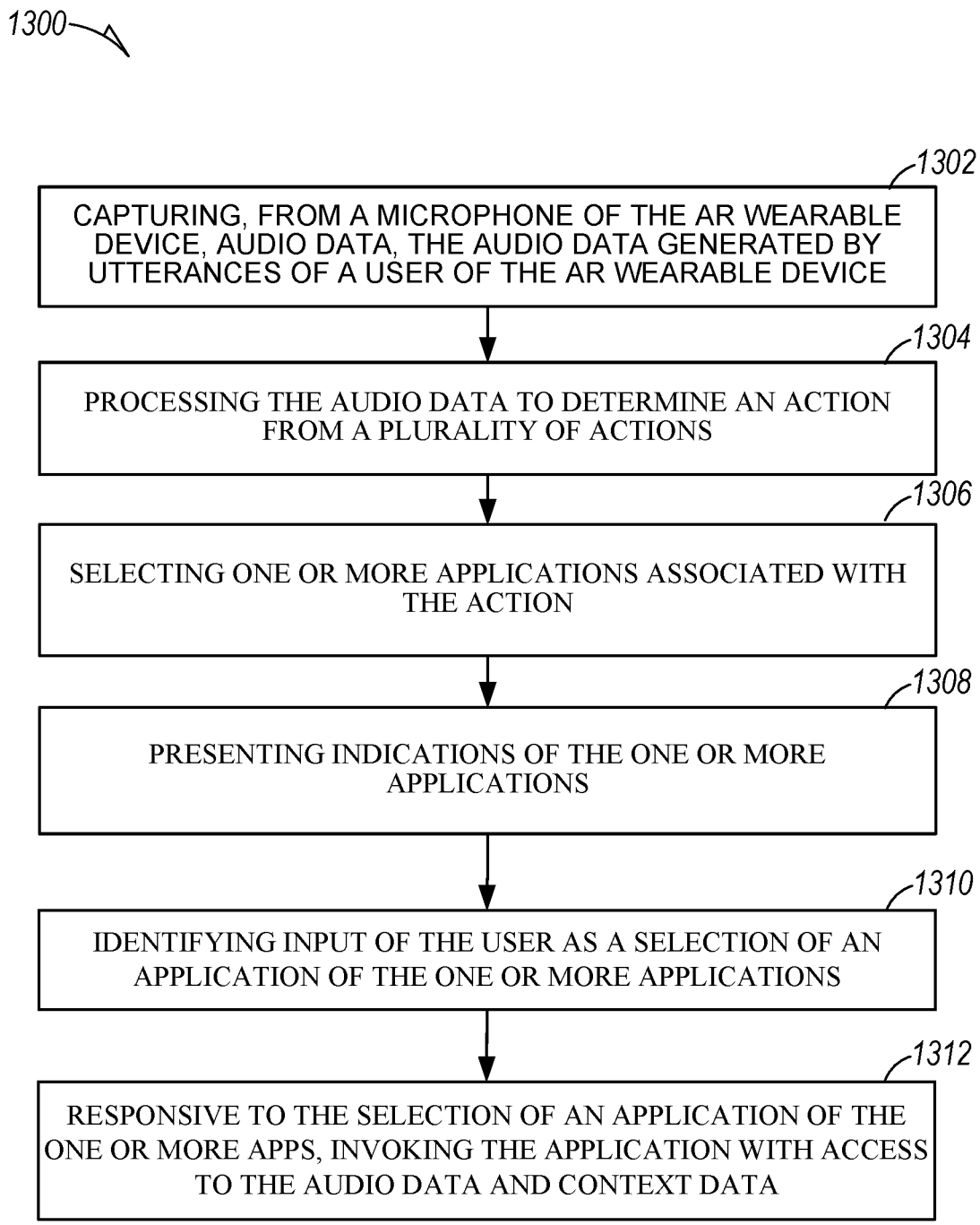
FIG. 13 illustrates a method for voice input for AR wearable devices, in accordance with some embodiments.

FIG. 13 illustrates a method 1300 for voice input for AR wearable devices, in accordance with some embodiments. The method 1300 is performed on an augmented reality (AR) wearable device. The method 1300 begins at operation 1302 with capturing, from a microphone of the AR wearable device, audio data, the audio data including and/or generated by utterances of a user of the AR wearable device. For example, the AR wearable device 602 captures audio data 613 using the microphone 603. The method 1300 continues at operation 1304 with determining, by processing the audio data, an action from a plurality of actions. For example, the keyword module 652 and/or the ML module 614 generate the transcription 656 and the scan manager 626 identifies actions 643 within the transcription 656.

The method 1300 continues at operation 1306 with selecting one or more applications associated with the action. For example, the scan manager 626 selects one or more applications 642 based on the actions 643 in the transcription 656. The method 1300 continues at operation 1308 with presenting indications of one or more applications. For example, as illustrated in FIG. 7, the UI module 634 presents applications 642 "play song title" 706 and "play game title" 708. The method 1300 continues at operation 1310 with identifying input of the user as a selection of an application of the one or more applications. For example, the UI module 634 determines a user intent 636 for which application 642 the user 646 selects.

The method 1300 continues at operation 1312 with responsive to the selection of an application of the one or more apps, invoking the application with access to the audio data and, in some embodiments, context data. For example, the scan manager 626 invokes, runs, or executes the selected application 642 where the content data 612 and transcription 656 is made available to the application 642. Additionally, the scan manager 626 ensures that privacy 618 conditions are satisfied before invoking permitting access to the transcription 656 or context data 612 to the application 642.

The method 1300 may include one or more additional operations. Operations of method 1300 may be performed in a different order. One or more of the operations of method 1300 may be optional. The method 1300 may be performed by the client device 102, system 600, glasses 1200, or another electronic device. Portions of the functionality may be performed on a server computer or host computer. For example, glasses 900 may be coupled to a host client device 102 or application server 114 where one or more of the operations are performed.

MACHINE ARCHITECTURE

Figure 14:
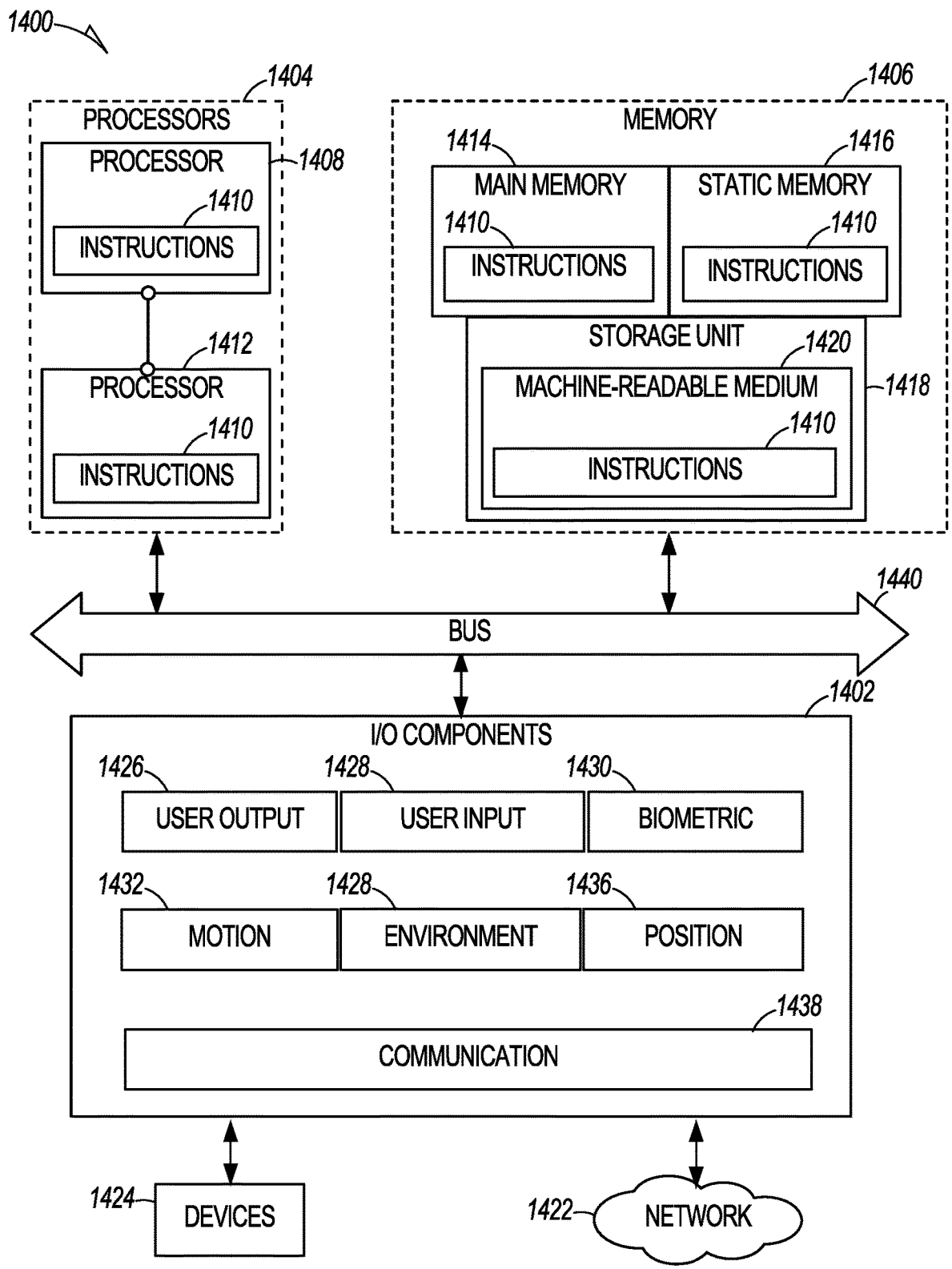
FIG. 14 is a diagrammatic representation of a machine in the form of a computer system within which a set of instructions may be executed for causing the machine to perform any one or more of the methodologies discussed herein, in accordance with some examples.

FIG. 14 is a diagrammatic representation of the machine 1400 within which instructions 1410 (e.g., software, a program, an application, an applet, an app, or other executable code) for causing the machine 1400 to perform any one or more of the methodologies discussed herein may be executed. For example, the instructions 1410 may cause the machine 1400 to execute any one or more of the methods described herein. The instructions 1410 transform the general, non-programmed machine 1400 into a particular machine 1400 programmed to carry out the described and illustrated functions in the manner described. The machine 1400 may operate as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1410, sequentially or otherwise, that specify actions to be taken by the machine 1400. Further, while only a single machine 1400 is illustrated, the term "machine" shall also be taken to include a collection of machines that individually or jointly execute the instructions 1410 to perform any one or more of the methodologies discussed herein. The machine 1400, for example, may comprise the client device 102 or any one of a number of server devices forming part of the messaging server system 108. In some examples, the machine 1400 may also comprise both client and server systems, with certain operations of a particular method or algorithm being performed on the server-side and with certain operations of the particular method or algorithm being performed on the client-side.

The machine 1400 may include processors 1404, memory 1406, and input/output I/O components 1402, which may be configured to communicate with each other via a bus 1440. In an example, the processors 1404 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1408 and a processor 1412 that execute the instructions 1410. The term "processor" is intended to include multi-core processors that may comprise two or more independent processors (sometimes referred to as "cores") that may execute instructions contemporaneously. Although FIG. 14 shows multiple processors 1404, the machine 1400 may include a single processor with a single-core, a single processor with multiple cores (e.g., a multi-core processor), multiple processors with a single core, multiple processors with multiples cores, or any combination thereof.

The memory 1406 includes a main memory 1414, a static memory 1416, and a storage unit 1418, both accessible to the processors 1404 via the bus 1440. The main memory 1406, the static memory 1416, and storage unit 1418 store the instructions 1410 embodying any one or more of the methodologies or functions described herein. The instructions 1410 may also reside, completely or partially, within the main memory 1414, within the static memory 1416, within machine-readable medium 1420 within the storage unit 1418, within at least one of the processors 1404 (e.g., within the Processor's cache memory), or any suitable combination thereof, during execution thereof by the machine 1400.

The I/O components 1402 may include a wide variety of components to receive input, provide output, produce output, transmit information, exchange information, capture measurements, and so on. The specific I/O components 1402 that are included in a particular machine will depend on the type of machine. For example, portable machines such as mobile phones may include a touch input device or other such input mechanisms, while a headless server machine will likely not include such a touch input device. It will be appreciated that the I/O components 1402 may include many other components that are not shown in FIG. 14. In various examples, the I/O components 1402 may include user output components 1426 and user input components 1428. The user output components 1426 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1402 may include biometric components 1430, motion components 1432, environmental components 1434, or position components 1436, among a wide array of other components. For example, the biometric components 1430 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1432 include acceleration sensor components (e.g., accelerometer), gravitation sensor components, rotation sensor components (e.g., gyroscope).

The environmental components 1434 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1436 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1402 further include communication components 1438 operable to couple the machine 1400 to a network 1422 or devices 1424 via respective coupling or connections. For example, the communication components 1438 may include a network interface Component or another suitable device to interface with the network 1422. In further examples, the communication components 1438 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1424 may be another machine or any of a wide variety of peripheral devices (e.g., a peripheral device coupled via a USB).

Moreover, the communication components 1438 may detect identifiers or include components operable to detect identifiers. For example, the communication components 1438 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1438, such as location via Internet Protocol (IP) geolocation, location via Wi-Fi® signal triangulation, location via detecting an NFC beacon signal that may indicate a particular location, and so forth.

The various memories (e.g., main memory 1414, static memory 1416, and memory of the processors 1404) and storage unit 1418 may store one or more sets of instructions and data structures (e.g., software) embodying or used by any one or more of the methodologies or functions described herein. These instructions (e.g., the instructions 1410), when executed by processors 1404, cause various operations to implement the disclosed examples.

The instructions 1410 may be transmitted or received over the network 1422, using a transmission medium, via a network interface device (e.g., a network interface component included in the communication components 1438) and using any one of several well-known transfer protocols (e.g., hypertext transfer protocol (HTTP)). Similarly, the instructions 1410 may be transmitted or received using a transmission medium via a coupling (e.g., a peer-to-peer coupling) to the devices 1424.

SOFTWARE ARCHITECTURE

Figure 15:
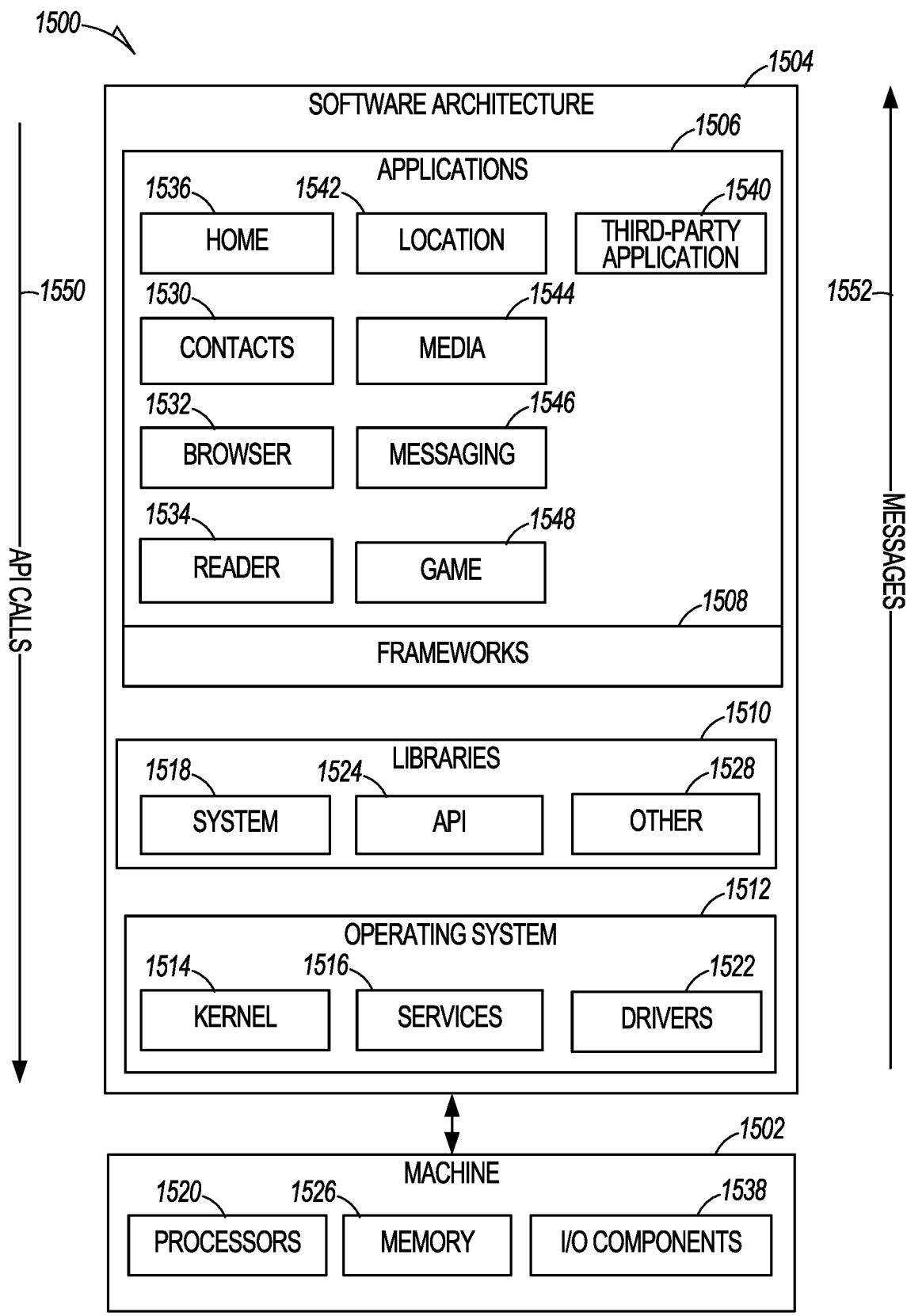
FIG. 15 is a block diagram showing a software architecture within which examples may be implemented.

FIG. 15 is a block diagram 1500 illustrating a software architecture 1504, which can be installed on any one or more of the devices described herein. The software architecture 1504 is supported by hardware such as a machine 1502 that includes processors 1520, memory 1526, and I/O components 1538. In this example, the software architecture 1504 can be conceptualized as a stack of layers, where each layer provides a particular functionality. The software architecture 1504 includes layers such as an operating system 1512, libraries 1510, frameworks 1508, and applications 1506. Operationally, the applications 1506 invoke API calls 1550 through the software stack and receive messages 1552 in response to the API calls 1550.

The operating system 1512 manages hardware resources and provides common services. The operating system 1512 includes, for example, a kernel 1514, services 1516, and drivers 1522. The kernel 1514 acts as an abstraction layer between the hardware and the other software layers. For example, the kernel 1514 provides memory management, processor management (e.g., scheduling), component management, networking, and security settings, among other functionality. The services 1516 can provide other common services for the other software layers. The drivers 1522 are responsible for controlling or interfacing with the underlying hardware. For instance, the drivers 1522 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1510 provide a common low-level infrastructure used by the applications 1506. The libraries 1510 can include system libraries 1518 (e.g., C standard library) that provide functions such as memory allocation functions, string manipulation functions, mathematic functions, and the like. In addition, the libraries 1510 can include API libraries 1524 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1510 can also include a wide variety of other libraries 1528 to provide many other APIs to the applications 1506.

The frameworks 1508 provide a common high-level infrastructure that is used by the applications 1506. For example, the frameworks 1508 provide various graphical user interface (GUI) functions, high-level resource management, and high-level location services. The frameworks 1508 can provide a broad spectrum of other APIs that can be used by the applications 1506, some of which may be specific to a particular operating system or platform.

In an example, the applications 1506 may include a home application 1536, a contacts application 1530, a browser application 1532, a reader application 1534, a location application 1542, a media application 1544, a messaging application 1546, a game application 1548, and a broad assortment of other applications such as a third-party application 1540. The applications 1506 are programs that execute functions defined in the programs. Various programming languages can be employed to create one or more of the applications 1506, structured in a variety of manners, such as object-oriented programming languages (e.g., Objective-C, Java, or C++) or procedural programming languages (e.g., C or assembly language). In a specific example, the third-party application 1540 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1540 can invoke the API calls 1550 provided by the operating system 1512 to facilitate functionality described herein.

PROCESSING COMPONENTS

Figure 16:
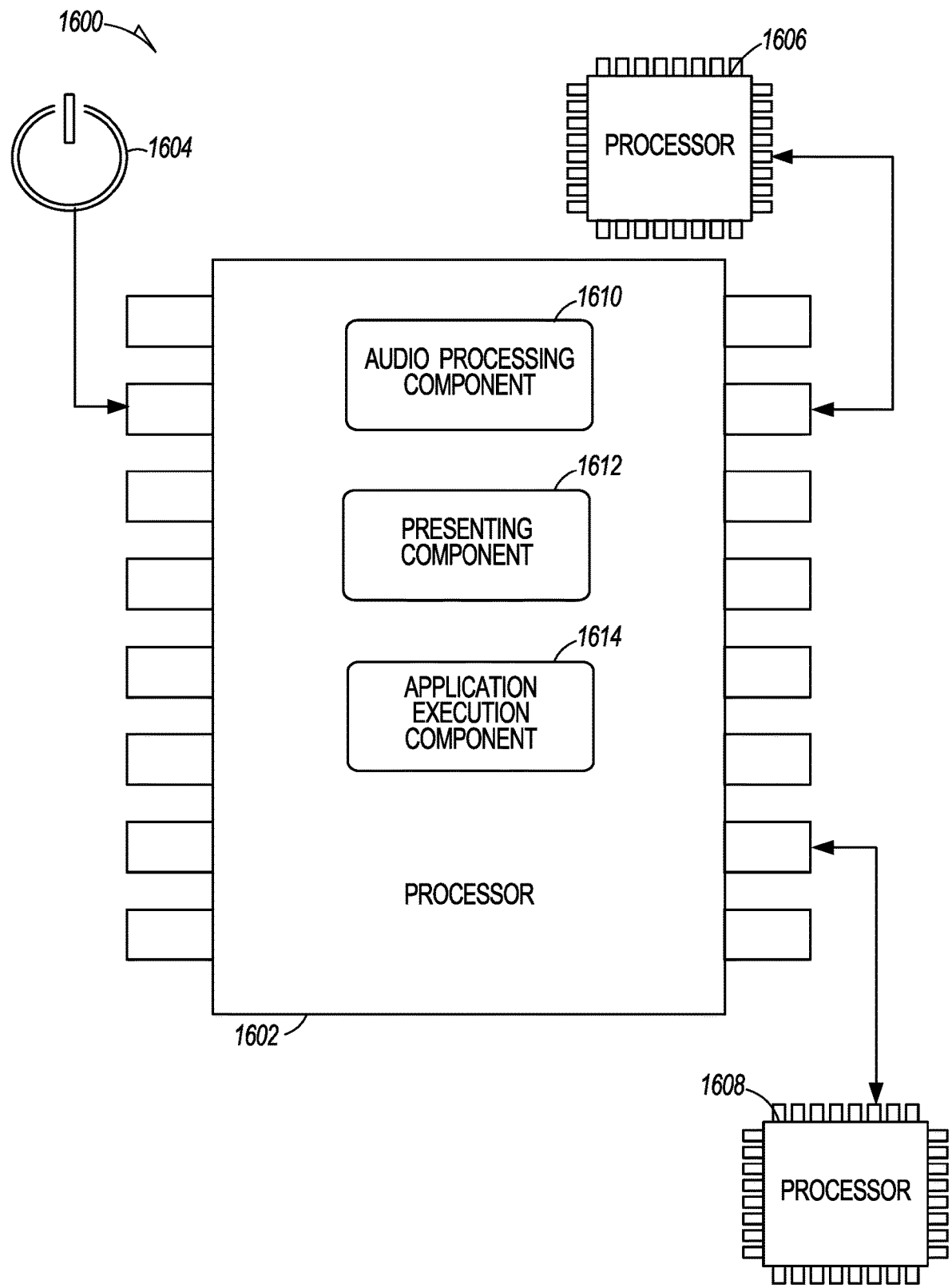
FIG. 16 is a diagrammatic representation of a processing environment, in accordance with some examples.

Turning now to FIG. 16, there is shown a diagrammatic representation of a processing environment 1600, which includes a processor 1602, a processor 1606, and a processor 1608 (e.g., a GPU, CPU or combination thereof).

The processor 1602 is shown to be coupled to a power source 1604, and to include (either permanently configured or temporarily instantiated) modules, namely an audio processing component 1610, a presenting component 1612, and an application execution component 1614. The audio processing component 1610 is invoked to process audio data 613. For example, examples of the audio processing component 1610 include the keyword module 652 and the ML module 614, which process audio data 613. The presenting component 1612 presents indications of applications 642 on a display 606 of an AR wearable device 602. An example of the presenting component 1612 is the UI module 634 of FIG. 6.

The application execution component 1614 invokes the applications 642 when the user 646 selects the application 642. An example of the application execution component 1614 is scan manager 626 of FIG. 6. The scan state 623 and other data may be in the memory associated with the processor 1602. As illustrated, the processor 1602 is communicatively coupled to both the processor 1606 and the processor 1608.

GLOSSARY

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, an AR glasses, a VR glasses, an AR wearable device, a desktop computer, a laptop, a portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium"

mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method performed on an augmented reality (AR) wearable device, the method comprising:
    capturing, from a microphone of the AR wearable device, first audio data, the first audio data including utterances of a user of the AR wearable device;
    processing, using a first processing component of the AR wearable device, the first audio data to determine the first audio data comprises a keyword;
    responsive to the first audio data indicating the keyword, capturing, from the microphone, second audio data;
    determining by processing, using a second processing component, the second audio data, an action from a plurality of actions;
    associating one or more applications with the action;
    selecting one or more applications associated with the action;
    presenting indications of the one or more applications;
    identifying input of the user as a selection of an application of the one or more applications; and
    responsive to the selection of the application, invoking the application with access to the second audio data.

2. The method of claim 1 wherein processing, using second processing component, the audio data to determine the action further comprises:
    sending, across a wireless connection to a host system, the second audio data and context data with an instruction for the audio data to be processed;
    receiving from the host system a transcription of the second audio data; and
    determining the action from the plurality of actions based on the transcription.

3. The method of claim 2 wherein the processing is based on the audio data, the context data, and the plurality of actions.

4. The method of claim 1 wherein the first processing component comprises: a machine learning model to determine the first audio data comprises the keyword, wherein the machine learning model was trained to recognize the keyword with vocalizations from the user.

5. The method of claim 1 wherein the second audio data is processed by sending the second audio data to a host device and the first audio data is processed by the AR wearable device.

6. The method of claim 3 further comprising:
    capturing, using an image capturing device of the AR wearable device, an image;
    determining a location of the AR wearable device; and
    accessing a current time, wherein the context data comprises one or more of: the image, the location, and the current time.

7. The method of claim 1 wherein the action is expressed by an action word or action phrase spoken by the user of the AR wearable device.

8. The method of claim 1 wherein the method further comprises:
    capturing, from the microphone, third audio data; and
    processing the third audio data to determine the selection of the application.

9. The method of claim 1 wherein the invoking the application with access to the second audio data further comprises:
    determining the user has granted permission for the audio data to be accessible to the application.

10. The method of claim 1 wherein the input of the user comprises a selection of a button of the AR wearable device or a touch of a touchpad of the AR wearable device.

11. The method of claim 1 wherein the presenting the indications of the one or more applications comprises:
    playing, using a speaker of the AR wearable device, indications of the one or more applications.

12. The method of claim 1 wherein the presenting the indications of the one or more applications comprises:
    presenting, on an AR display of the AR wearable device, the indications of the one or more applications.

13. The method of claim 12 further comprising:
    presenting a selection shape on the AR display; and
    identifying the input of the user as the selection of the application based on the indication of the application being within the selection shape, wherein a position of the selection shape remains stable as the AR wearable device moves and positions of the indications of the one or more applications move in accordance with movement of the AR wearable device.

14. The method of claim 12 further comprising:
    processing the input of the user to identify a gesture, wherein the input is a movement of an appendage of a user or vocalization of sounds by the user; and
    identifying the input of the user as the selection of the application based on the gesture indicating the selection of the application.

15. The method of claim 1 wherein the AR wearable device is AR glasses.

16. An augmented reality (AR) wearable device comprising:
    a first processing component, the first processing component configured to process first audio data to determine the first audio data comprises a keyword;
    a second processing component; and
    a memory storing instructions that, when executed by the second processing component, configure the AR wearable device to perform operations comprising:
        capturing, from a microphone of the AR wearable device, first audio data, the first audio data including utterances of a user of the AR wearable device;
        responsive to the first audio data indicating the keyword, capturing, from the microphone, second audio data;
        determining by processing the second audio data, an action from a plurality of actions;
        associating one or more applications with the action;
        selecting one or more applications associated with the action;

presenting indications of the one or more applications;

identifying input of the user as a selection of an application of the one or more applications; and responsive to the selection of the application, invoking the application with access to the second audio data.

17. The AR wearable device of claim 16 wherein processing the audio data to determine the action further comprises:

sending, across a wireless connection to a host system, the second audio data and context data with an instruction for the audio data to be processed;

receiving from the host system a transcription of the second audio data; and determining the action from the plurality of actions based on the transcription.

18. A non-transitory computer-readable storage medium, the computer-readable storage medium including instructions that when executed by an augmented reality (AR) wearable device, cause the AR wearable device to perform operations comprising:

capturing, from a microphone of the AR wearable device, first audio data, the first audio data including utterances of a user of the AR wearable device;

processing, using a first processing component of the AR wearable device, the first audio data to determine the first audio data comprises a keyword;

responsive to the first audio data indicating the keyword, capturing, from the microphone, second audio data;

determining by processing, using a second processing component, the second audio data, an action from a plurality of actions;

associating one or more applications with the action;

selecting one or more applications associated with the action;

presenting indications of the one or more applications;

identifying input of the user as a selection of an application of the one or more applications; and responsive to the selection of the application, invoking the application with access to the second audio data.

* * * * *